US011424883B2

(12) United States Patent
Park et al.

(10) Patent No.: US 11,424,883 B2
(45) Date of Patent: Aug. 23, 2022

(54) METHOD FOR TRANSMITTING SOUNDING REFERENCE SIGNAL (SRS) IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Haewook Park, Seoul (KR); Kunil Yum, Seoul (KR); Sukhyon Yoon, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 16/979,149

(22) PCT Filed: Mar. 28, 2019

(86) PCT No.: PCT/KR2019/003658
§ 371 (c)(1),
(2) Date: Sep. 8, 2020

(87) PCT Pub. No.: WO2019/190236
PCT Pub. Date: Oct. 3, 2019

(65) Prior Publication Data
US 2020/0403749 A1 Dec. 24, 2020

(30) Foreign Application Priority Data
Mar. 29, 2018 (KR) .................. 10-2018-0036878

(51) Int. Cl.
*H04L 5/00* (2006.01)
*H04W 72/10* (2009.01)
(52) U.S. Cl.
CPC ........... *H04L 5/0048* (2013.01); *H04W 72/10* (2013.01)

(58) Field of Classification Search
CPC ... H04L 5/0048; H04L 5/0051; H04L 5/0007; H04L 5/0096; H04W 72/10; H04W 72/1242; H04B 7/0689
See application file for complete search history.

(56) References Cited

U.S. PATENT DOCUMENTS

2011/0142040 A1* 6/2011 Funamoto .......... G06K 7/10297
370/389
2012/0039273 A1* 2/2012 Nam ...................... H04L 5/001
455/450

(Continued)

FOREIGN PATENT DOCUMENTS

WO  2016/117974  1/2016
WO  2016/204549  6/2016

OTHER PUBLICATIONS

"Remaining issues on SRS design" 3GPP TSG RAN WG1 Meeting #92 Athens, Greece, Feb. 26-Mar. 2, 2018 (R1-1801806) (Year: 2018).*

(Continued)

*Primary Examiner* — Ian N Moore
*Assistant Examiner* — Sun Jong Kim
(74) *Attorney, Agent, or Firm* — Lee Hong Degerman Kang Waimey

(57) ABSTRACT

A method for a user equipment (UE) to transmit a sounding reference signal (SRS) in a wireless communication system is disclosed. The method includes receiving, from a base station, configuration information related to a first SRS resource assigned for transmission of a first SRS and a second SRS resource assigned for transmission of a second SRS, wherein the configuration information includes type information representing whether or not a SRS transmission has periodicity, and usage information representing which usage the SRS has; and when a transmission time of the first SRS is the same as a transmission time of the second SRS, (Continued)

transmitting the first SRS or the second SRS to the base station based on a priority between the first SRS and the second SRS, wherein the priority is determined based on at least one of the type information or the usage information.

17 Claims, 12 Drawing Sheets

(56) References Cited

U.S. PATENT DOCUMENTS

| | | | | |
|---|---|---|---|---|
| 2019/0386733 | A1* | 12/2019 | Nilsson | H04B 7/063 |
| 2020/0021976 | A1* | 1/2020 | Shimezawa | H04L 1/0063 |
| 2020/0036492 | A1* | 1/2020 | Sun | H04L 5/14 |
| 2020/0162214 | A1* | 5/2020 | Tang | H04L 5/0048 |
| 2020/0322030 | A1* | 10/2020 | Yuan | H04B 7/0632 |

OTHER PUBLICATIONS

PCT International Application No. PCT/KR2019/003658, International Search Report dated Jul. 12, 2019, 5 pages.
Huawei et al., "Remaining issues on SRS design," 3GPP TSG RAN WG1 Meeting #92, R1-1801806, Athens, Greece, Feb. 26-Mar. 2, 2018, 5 pages.
Catt, "Remaining issues on SRS," 3GPP TSG RAN WG1 Meeting #92, R1-1801726, Athens, Greece, Feb. 26-Mar. 2, 2018, 3 pages.
Samsung, "Issues on SRS," 3GPP TSG RAN WG1 Meeting #92, R1-1801971, Athens, Greece, Feb. 26-Mar. 2, 2018, 4 pages.

* cited by examiner

【Figure 1】
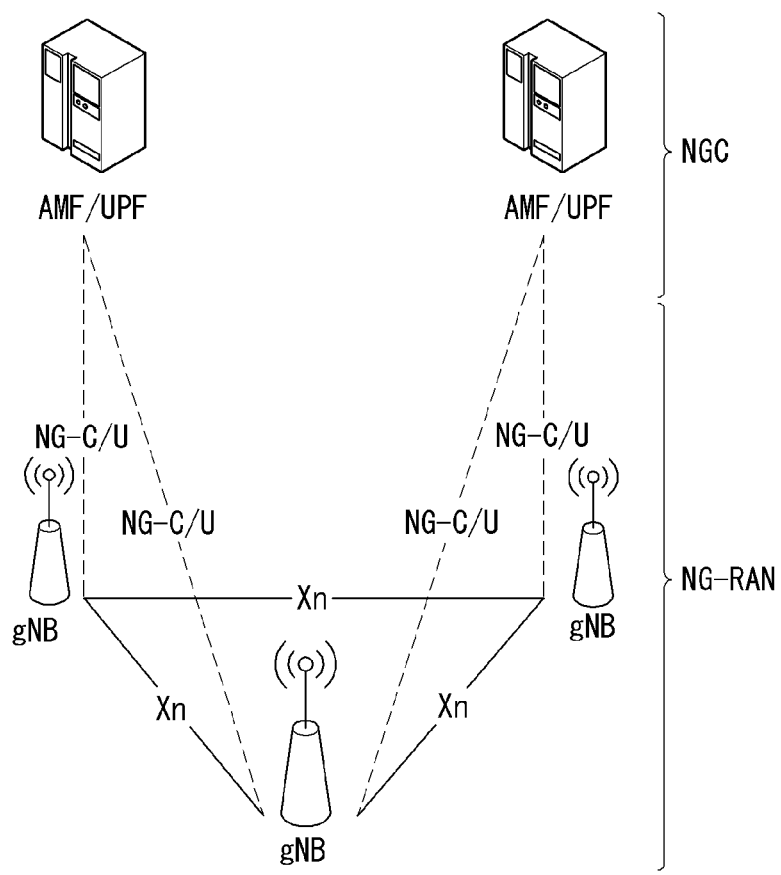
【Figure 2】
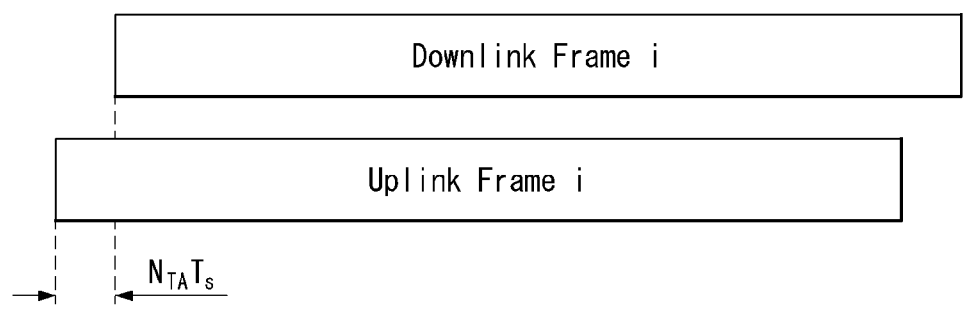

【Figure 3】
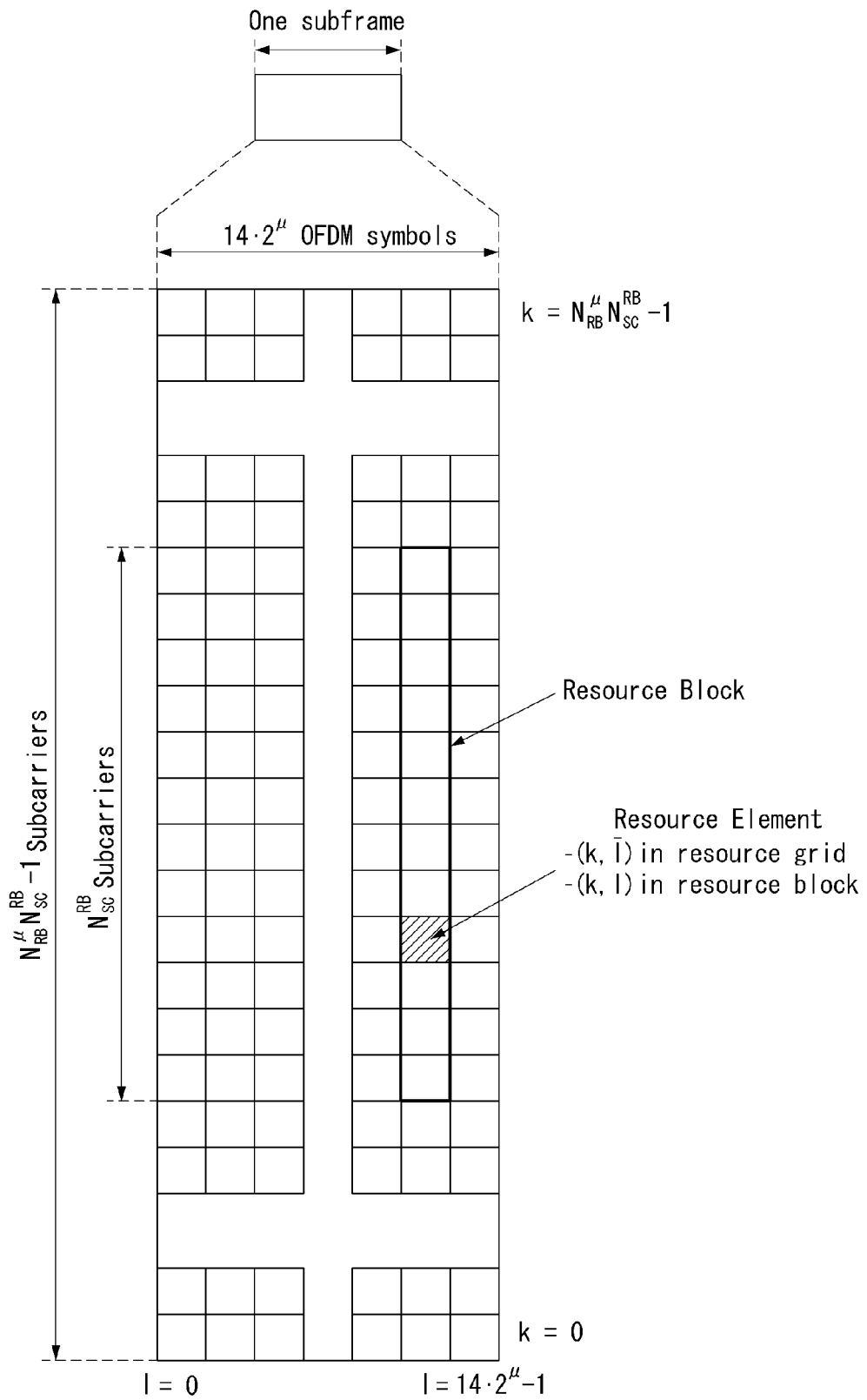

[Figure 4]
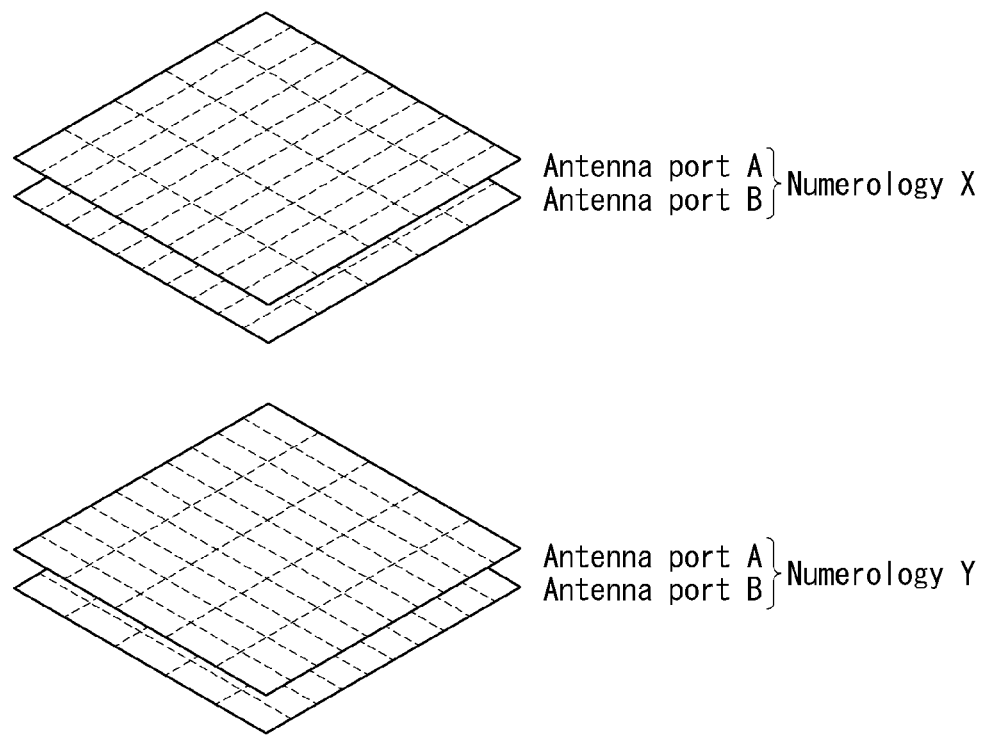

[Figure 5]
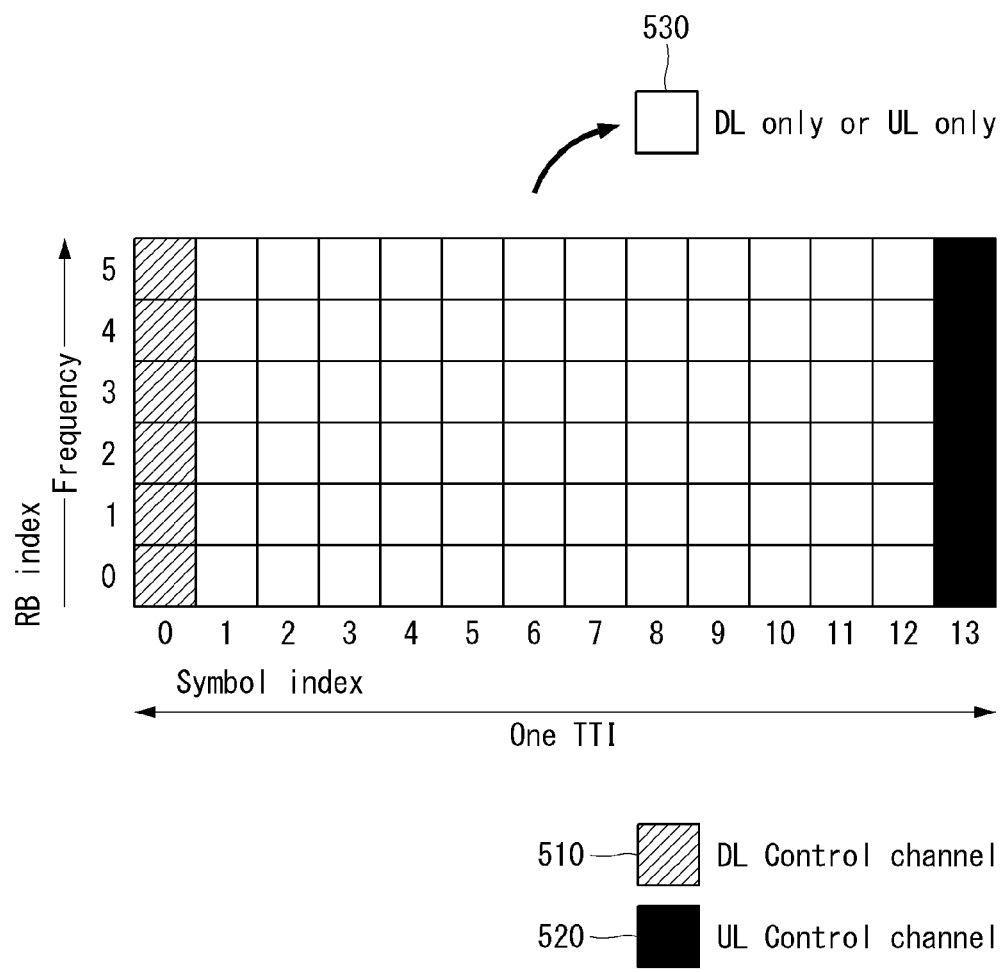

[Figure 6]
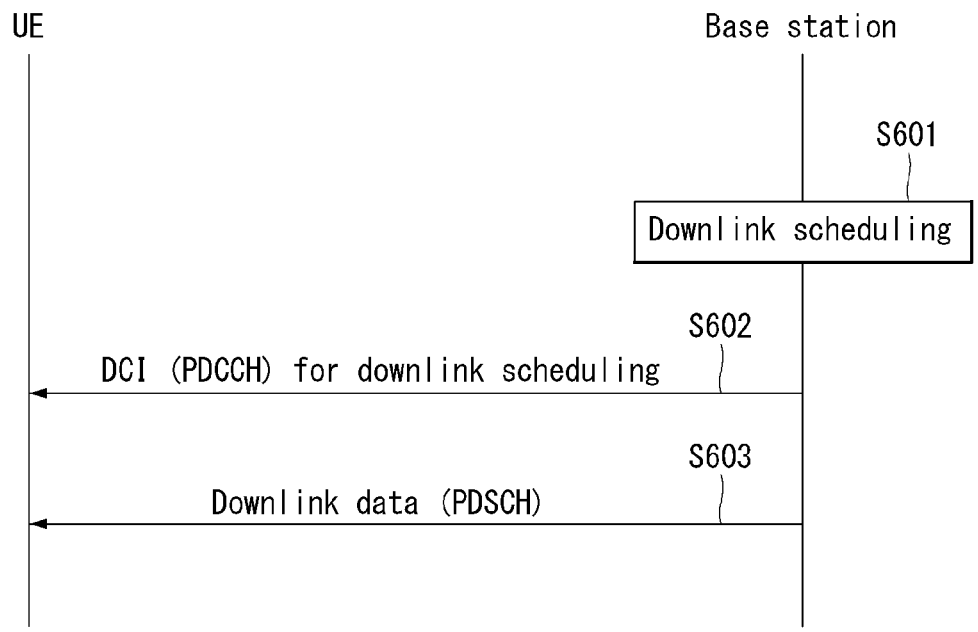
[Figure 7]
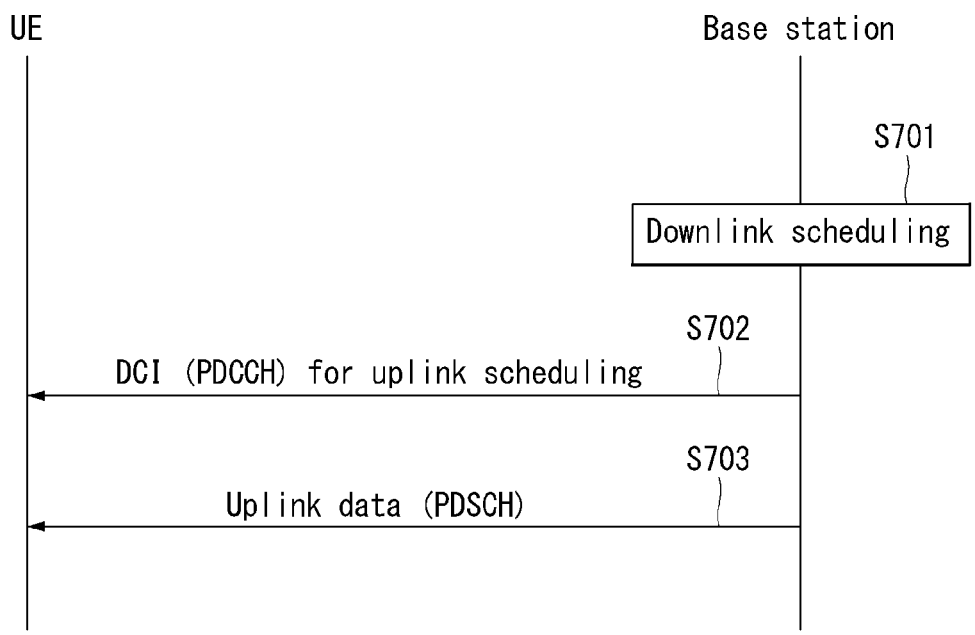

[Figure 8]
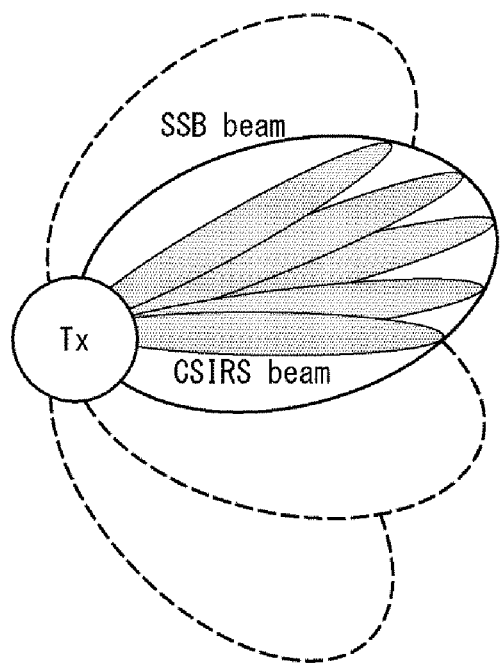
[Figure 9]
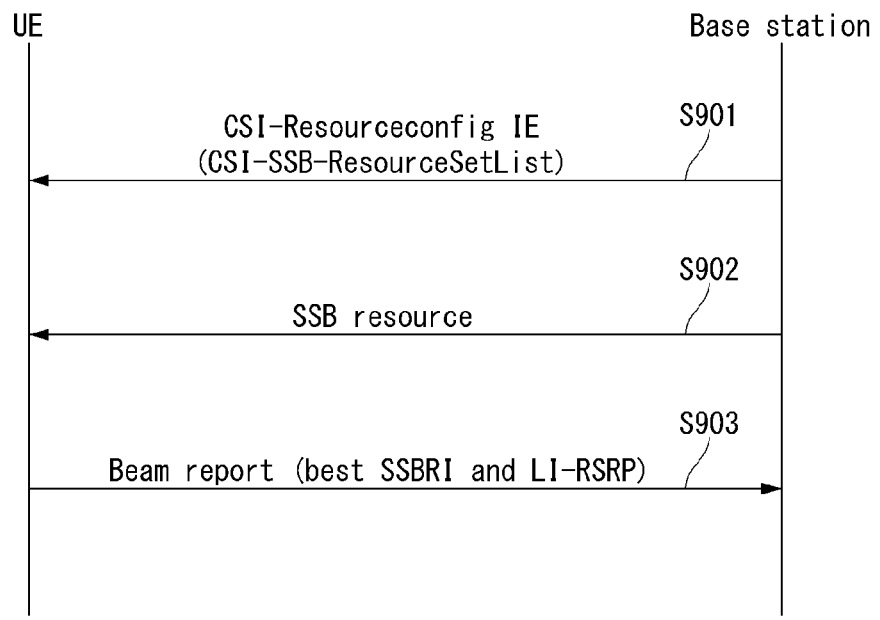

【Figure 10】
(a)
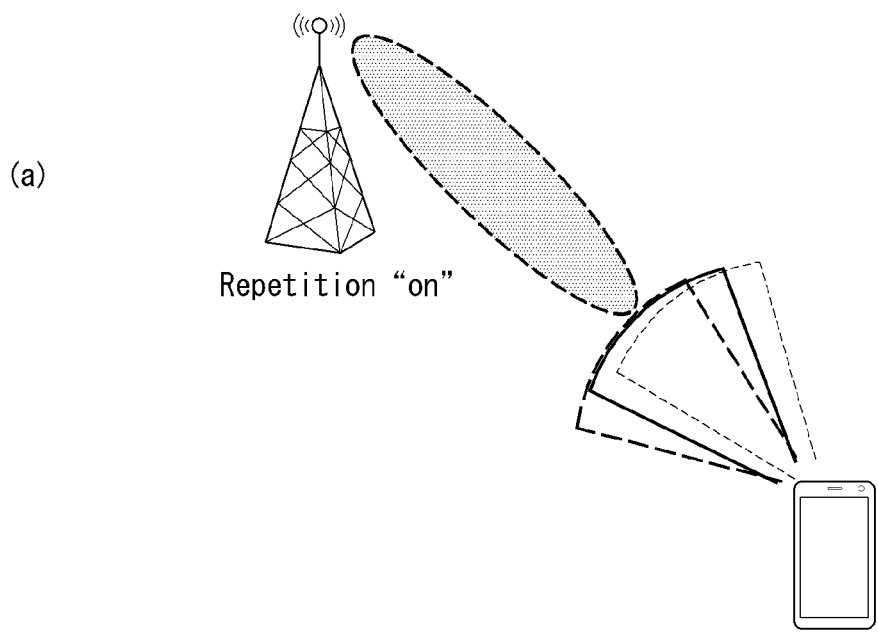
(b)
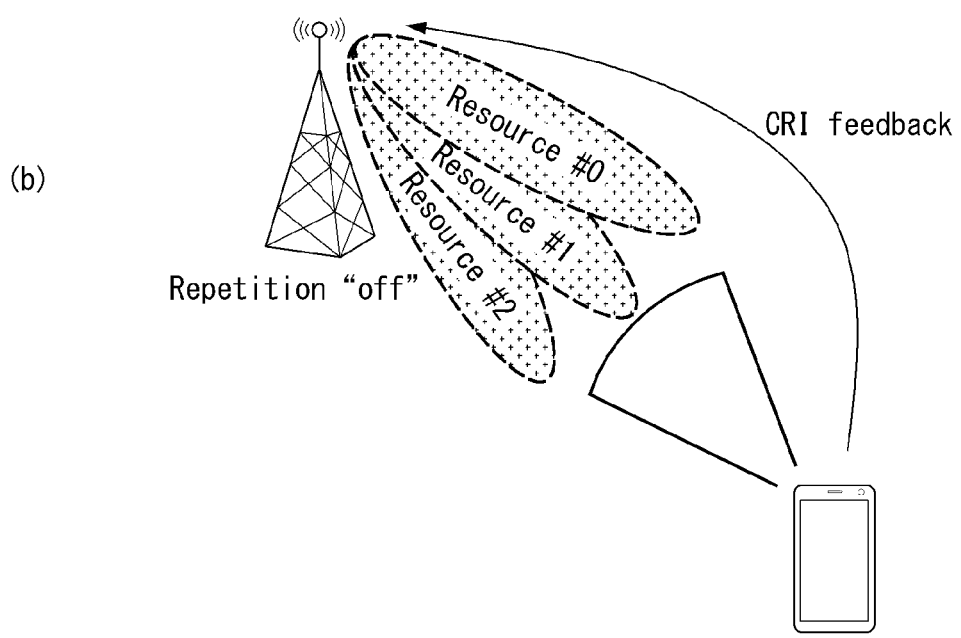

[Figure 11]
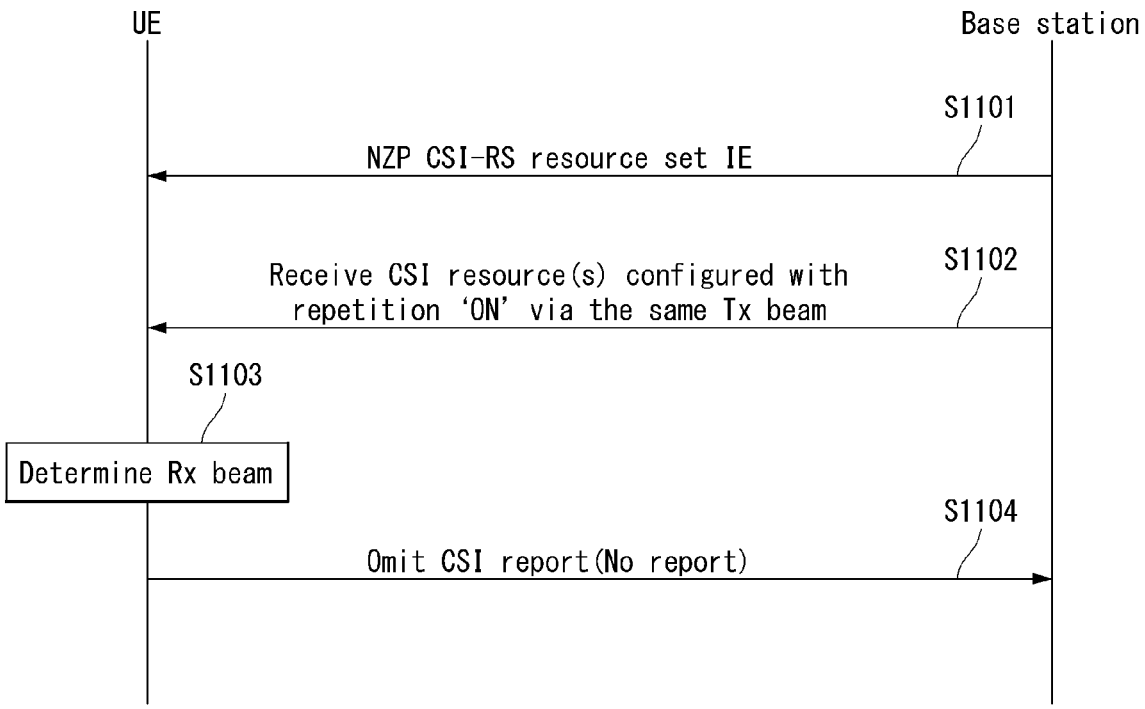
[Figure 12]
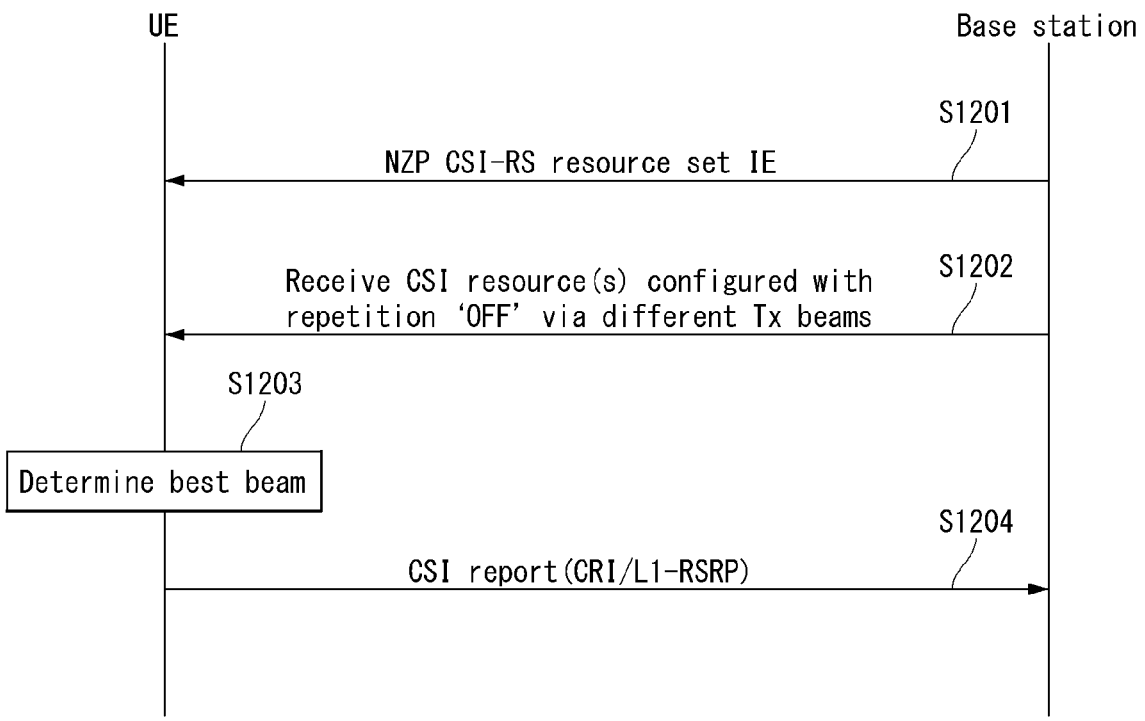

【Figure 13】
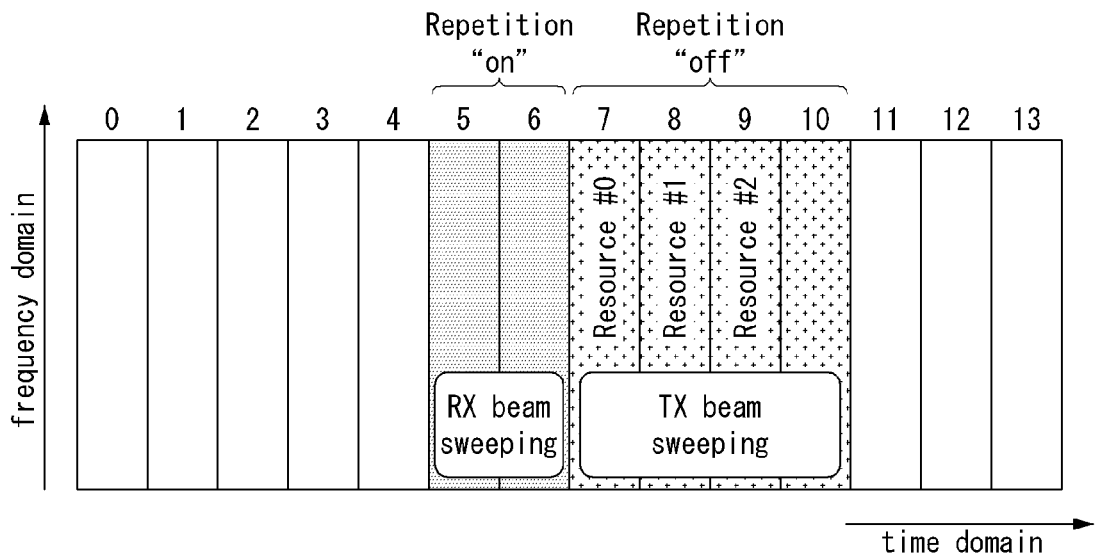
【Figure 14】
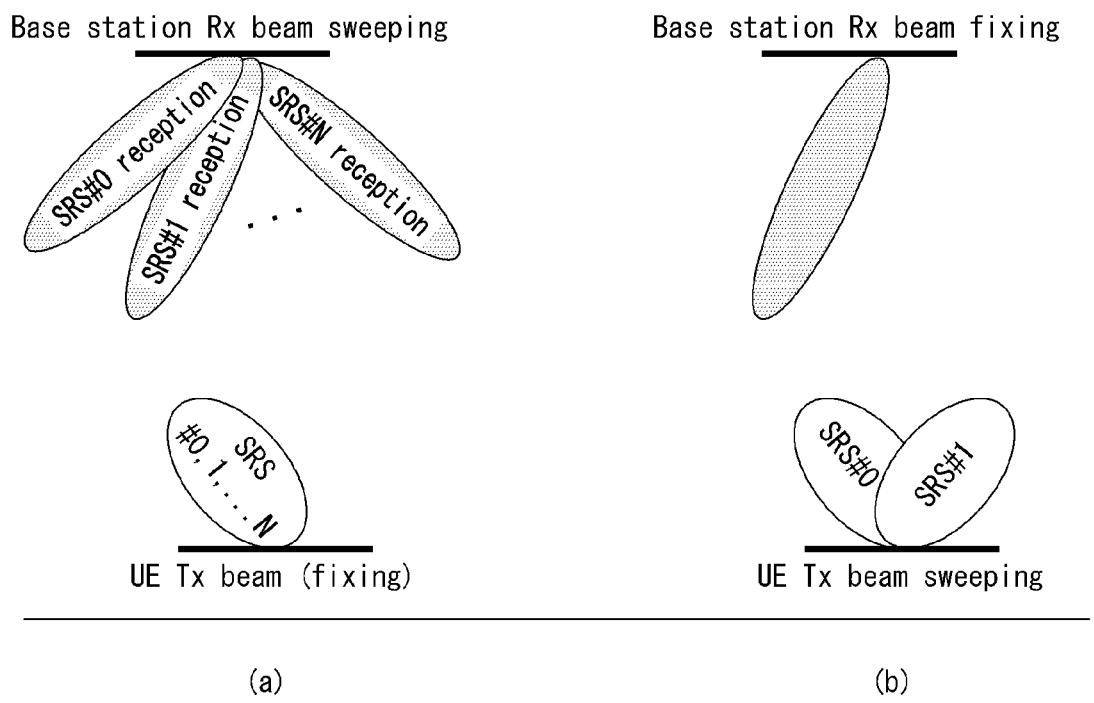
(a)  (b)

【Figure 15】
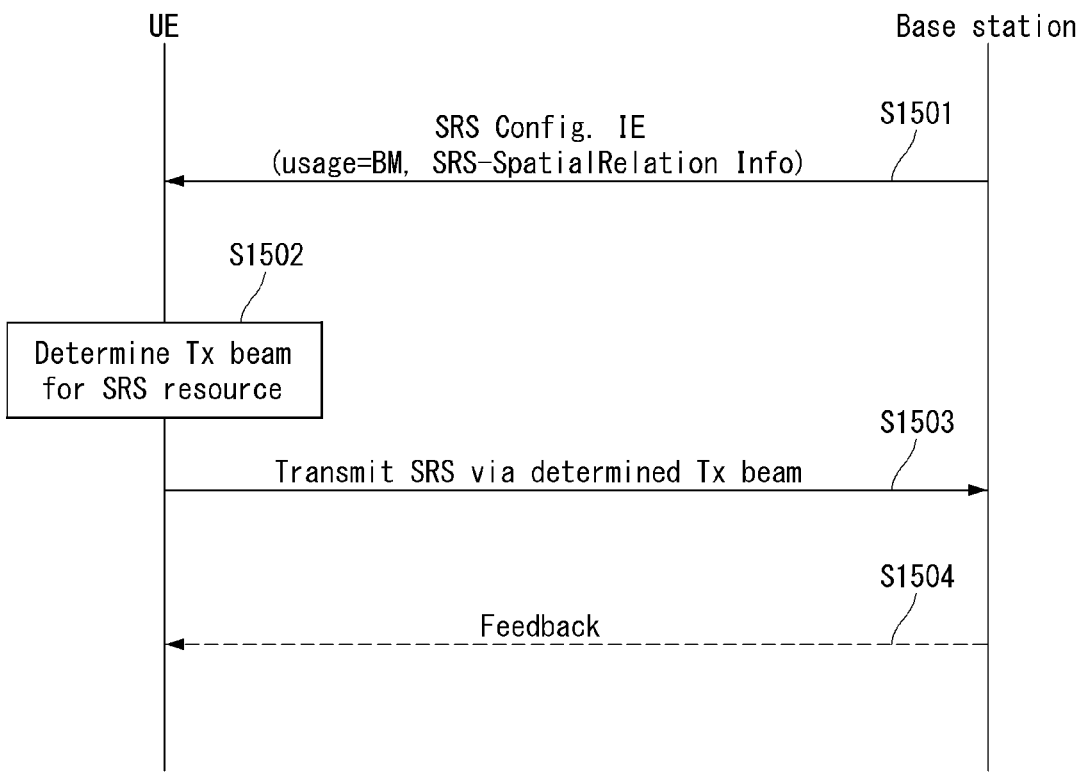
【Figure 16】
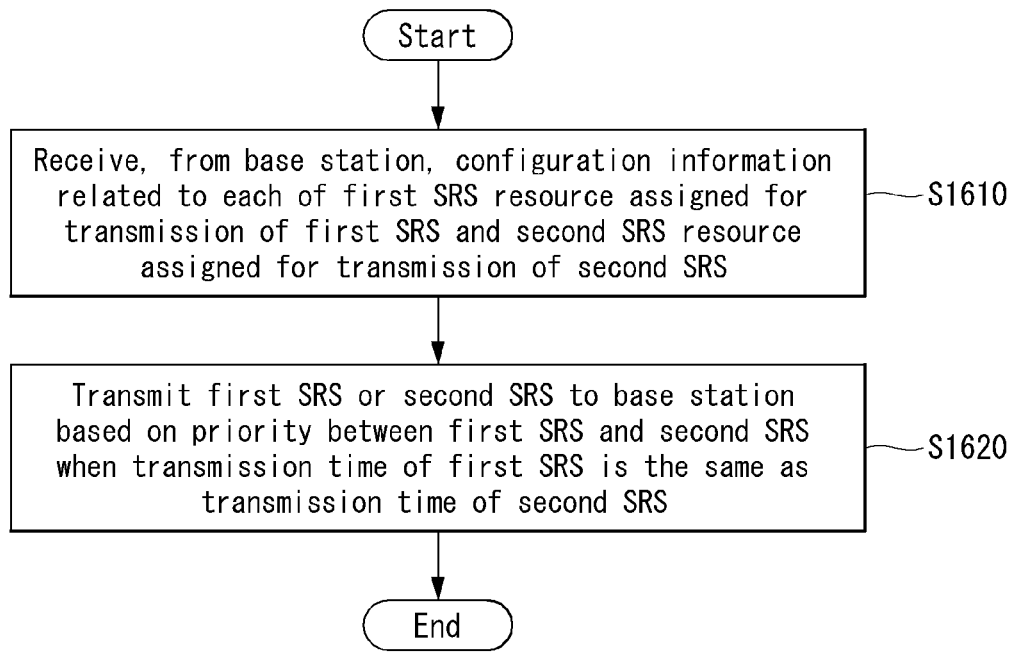

【Figure 17】
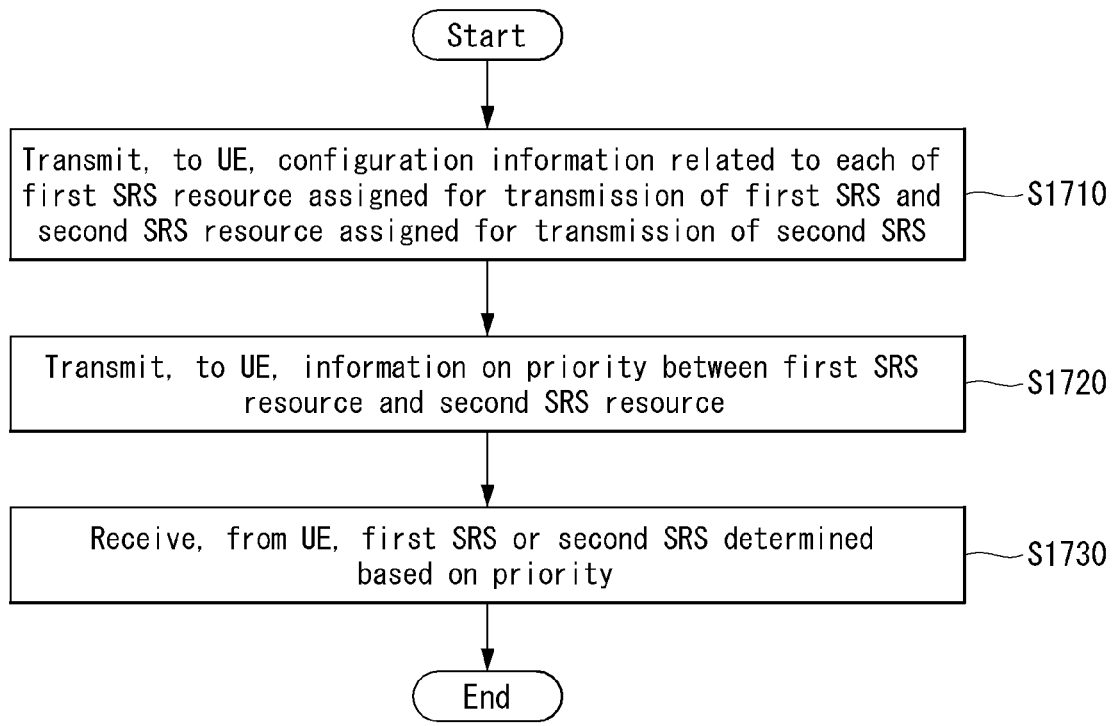
【Figure 18】
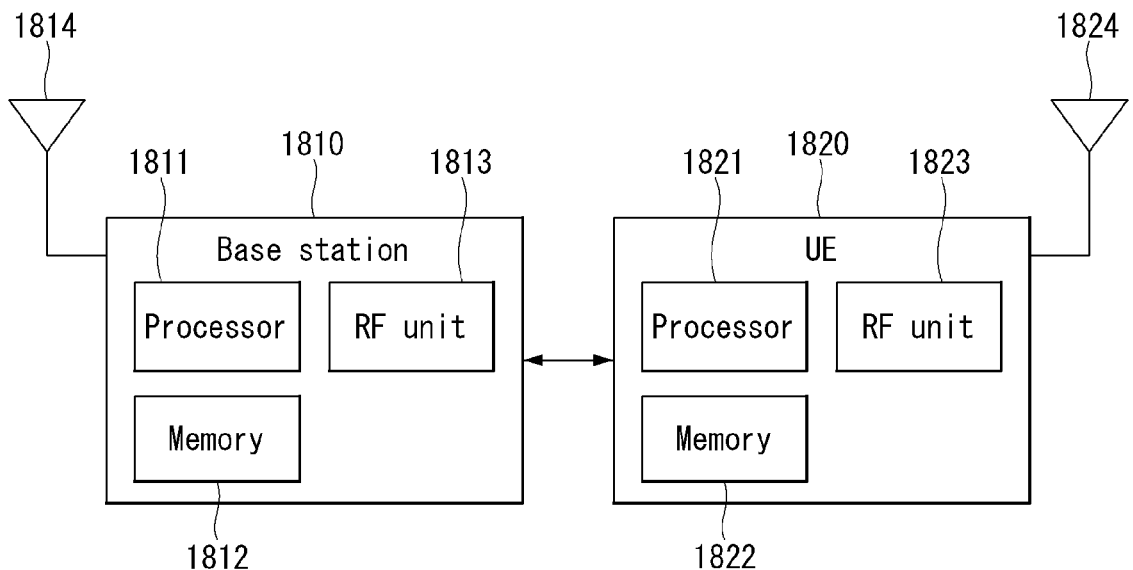

[Figure 19]
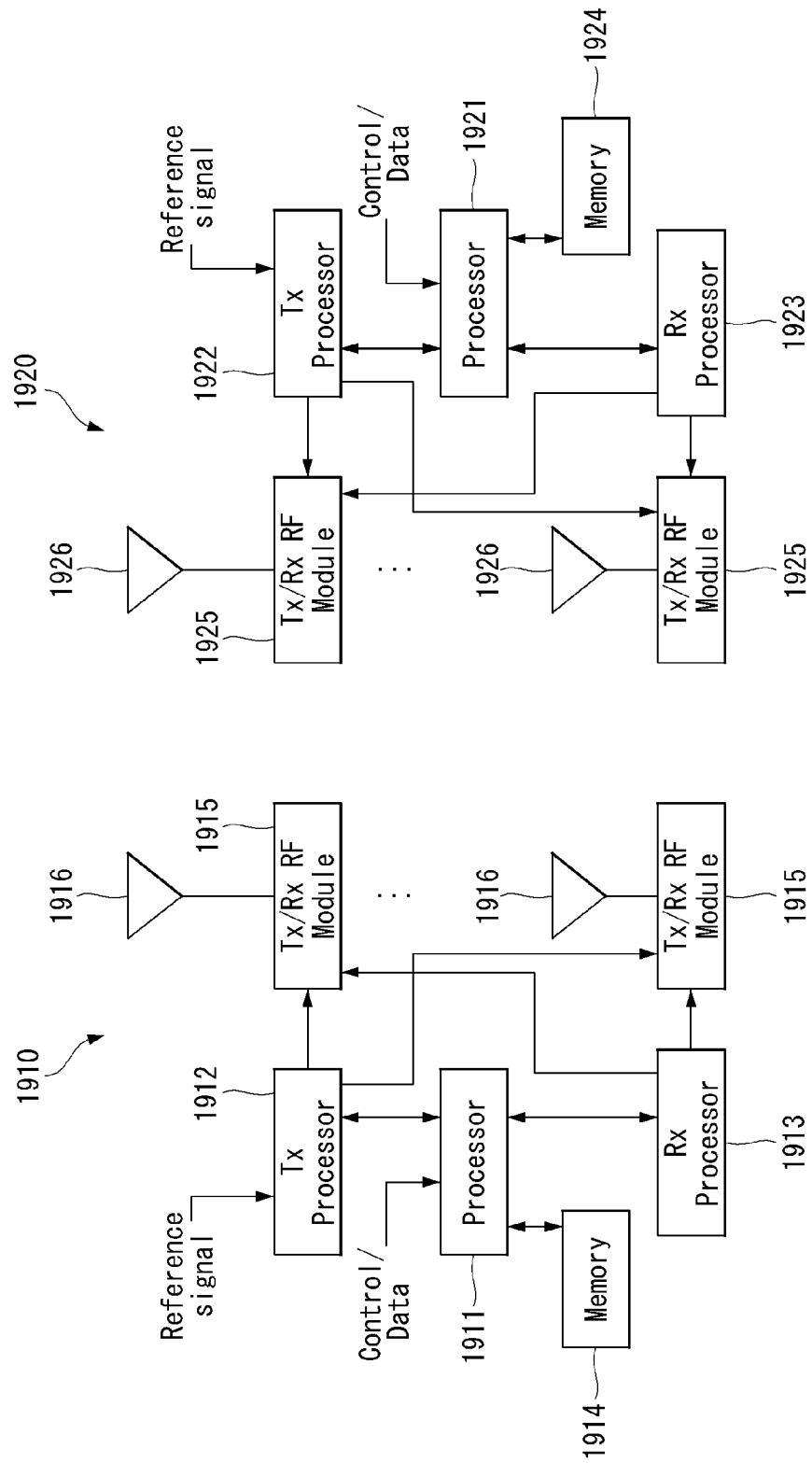

METHOD FOR TRANSMITTING SOUNDING REFERENCE SIGNAL (SRS) IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/003658, filed on Mar. 28, 2019, which claims the benefit of earlier filing date and right of priority to Korean Application No. 10-2018-0036878, filed on Mar. 29, 2018, the contents of which are all hereby incorporated by reference herein in their entirety.

TECHNICAL FIELD

The present disclosure relates to a wireless communication system, and more particularly to a method for transmitting a sounding reference signal and a device supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure provides a method for transmitting a sounding reference signal (SRS) on a SRS resource.

The present disclosure also provides a method for transmitting a SRS based on a predetermined priority when a collision occurs between a plurality of SRS resources.

The technical problems to be solved by the present disclosure are not limited by the above-mentioned technical problems, and other technical problems which are not mentioned above can be clearly understood from the following description by those skilled in the art to which the present disclosure pertains.

Technical Solution

In one aspect, there is provided a method for transmitting a sounding reference signal (SRS) in a wireless communication system.

More specifically, the method performed by a user equipment (UE) comprises receiving, from a base station, configuration information related to a first SRS resource assigned for transmission of a first SRS and a second SRS resource assigned for transmission of a second SRS, wherein the configuration information includes type information representing whether or not a SRS transmission has periodicity, and usage information representing which usage the SRS has; and when a transmission time of the first SRS is the same as a transmission time of the second SRS, transmitting the first SRS or the second SRS to the base station based on a priority between the first SRS and the second SRS, wherein the priority is determined based on at least one of the type information or the usage information.

The priority is received via higher layer signalling.

The type information is one of periodic, semi-persistent, and aperiodic, and the usage information is one of beam-management, codebook, non-codebook, and antenna switching.

The priority is determined based on the type information. For example, a SRS (aperiodic SRS) having an aperiodic transmission period has a higher priority than a SRS (semi-persistent SRS) having a semi-persistent transmission period, and the SRS (semi-persistent SRS) having the semi-persistent transmission period has a higher priority than a SRS (periodic SRS) having a periodic transmission period.

The configuration information further includes trigger information for the transmission of the first SRS and the second SRS. The priority is determined based on the order in which the trigger information is received when the type information is the same.

The priority is determined based on the usage information. For example, the beam-management has a higher priority than the antenna switching, the antenna switching has a higher priority than the codebook, and the codebook has a higher priority than the non-codebook.

The configuration information further includes information on a symbol number of the assigned first SRS resource and second SRS resource. The priority is determined based on the information on the symbol number.

The configuration information further includes information on a repetition factor. The priority is determined based on the information on the repetition factor.

Transmitting the first SRS or the second SRS to the base station comprises, when transmission times of some resources of the resources assigned for the transmission of the first SRS or the second SRS to the base station are the same, dropping a resource assigned for transmission of a SRS with a low priority among the some resources, or delaying a resource assigned for transmission of a SRS with the low priority among the some resources by one symbol.

In another aspect, there is provided a user equipment (UE) transmitting a sounding reference signal (SRS) in a wireless communication system, the UE comprising a radio frequency (RF) module configured to transmit and receive a radio signal; and a processor functionally connected to the RF module, wherein the processor is configured to receive, from a base station, configuration information related to a first SRS resource assigned for transmission of a first SRS and a second SRS resource assigned for transmission of a second SRS, wherein the configuration information includes type information representing whether or not a SRS transmission has periodicity, and usage information representing which usage the SRS has; and when a transmission time of the first SRS is the same as a transmission time of the second SRS, transmit the first SRS or the second SRS to the base station based on a priority between the first SRS and the second SRS, wherein the priority is determined based on at least one of the type information or the usage information.

The priority is received via higher layer signalling.

The type information is one of periodic, semi-persistent, and aperiodic, and the usage information is one of beam-management, codebook, non-codebook, and antenna switching.

The priority is determined based on the type information. For example, a SRS (aperiodic SRS) having an aperiodic transmission period has a higher priority than a SRS (semi-persistent SRS) having a semi-persistent transmission period, and the SRS (semi-persistent SRS) having the semi-persistent transmission period has a higher priority than a SRS (periodic SRS) having a periodic transmission period.

The configuration information further includes trigger information for the transmission of the first SRS and the second SRS. The priority is determined based on the order in which the trigger information is received when the type information is the same.

The priority is determined based on the usage information. For example, the beam-management has a higher priority than the antenna switching, the antenna switching has a higher priority than the codebook, and the codebook has a higher priority than the non-codebook.

The configuration information further includes information on a symbol number of the assigned first SRS resource and second SRS resource. The priority is determined based on the information on the symbol number.

The configuration information further includes information on a repetition factor. The priority is determined based on the information on the repetition factor.

When transmission times of some resources of the resources assigned for the transmission of the first SRS or the second SRS to the base station are the same, the processor is configured to drop a resource assigned for transmission of a SRS with a low priority among the some resources, or delay a resource assigned for transmission of a SRS with the low priority among the some resources by one symbol.

In another aspect, there is provided a method for a base station to receive a sounding reference signal (SRS) in a wireless communication system, the method comprising transmitting, to a user equipment (UE), configuration information related to a first SRS resource assigned for transmission of a first SRS and a second SRS resource assigned for transmission of a second SRS, wherein the configuration information includes type information representing whether or not a SRS transmission has periodicity, and usage information representing which usage the SRS has; transmitting, to the UE, information on a priority between the first SRS resource and the second SRS resource; and receiving, from the UE, the first SRS or the second SRS determined based on the priority, wherein the priority is determined based on at least one of the type information or the usage information.

Advantageous Effects

The present disclosure can efficiently transmit a sounding reference signal (SRS) by providing a method for transmitting a SRS on SRS resources.

The present disclosure can efficiently transmit a SRS by providing a method for determining a SRS to be transmitted based on a SRS priority when a collision occurs between a plurality of SRS resources for transmitting the SRS.

Effects which can be obtained in the present disclosure are not limited to the aforementioned effects, and other unmentioned effects will be clearly understood by those skilled in the art from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 illustrates an example of an overall NR system structure to which a method described in the present disclosure is applicable.

FIG. 2 illustrates a relationship between an uplink frame and a downlink frame in a wireless communication system to which a method described in the present disclosure is applicable.

FIG. 3 illustrates an example of a resource grid supported in a wireless communication system to which a method described in the present disclosure is applicable.

FIG. 4 illustrates examples of a resource grid per antenna port and numerology to which a method described in the present disclosure is applicable.

FIG. 5 illustrates an example of a self-contained structure to which a method described in the present disclosure is applicable.

FIG. 6 illustrates an example of a downlink transmission and reception operation.

FIG. 7 illustrates an example of an uplink transmission and reception operation.

FIG. 8 illustrates an example of beamforming using a SSB and a CSI-RS.

FIG. 9 is a flow chart illustrating an example of a DL BM procedure using a SSB.

FIG. 10 illustrates another example of a DL BM procedure using a CSI-RS.

FIG. 11 is a flow chart illustrating an example of a reception beam determination process of a UE.

FIG. 12 is a flow chart illustrating an example of a transmission beam determination process of a base station.

FIG. 13 illustrates an example of resource allocation in a time domain and a frequency domain.

FIG. 14 illustrates an example of an UL BM procedure using a SRS.

FIG. 15 is a flow chart illustrating an example of an UL BM procedure using a SRS.

FIG. 16 is a flow chart illustrating an operation method of a UE performing a method for transmitting a SRS based on a priority described in the present disclosure.

FIG. 17 is a flow chart illustrating an operation method of a base station performing a method for receiving a SRS based on a priority described in the present disclosure.

FIG. 18 illustrates a block configuration diagram of a wireless communication device to which methods described in the present disclosure are applicable.

FIG. 19 illustrates another block configuration diagram of a wireless communication device to which methods described in the present disclosure are applicable.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the present disclosure, "base station" means a network terminal node to directly communicate with a user equipment (UE). In the disclosure, a particular operation described to be performed by a base station may be performed by an upper node of the base station in some cases. In other words, in a network constituted of multiple network nodes including the base station, various operations performed to communicate with a UE may be performed by the base station or other network nodes than the base station. "Base station (BS)" may be interchangeably used with the term "fixed station", "Node B", "eNB (evolved-NodeB)", "BTS (base transceiver system)", "AP (Access Point)", or "gNB (general NB, generation NB)". "Terminal" may refer to a stationary or mobile device and may be interchangeably used with the term "UE (User Equipment)", "MS (Mobile Station)", "UT (user terminal)", "MSS (Mobile Subscriber Station)", "SS (Subscriber Station)", "AMS (Advanced Mobile Station)", "WT (Wireless terminal)", "MTC (Machine-Type Communication) device", "M2M (Machine-to-Machine) device", or "D2D (Device-to-Device) device".

Hereinafter, downlink (DL) means communication from a base station to a UE, and uplink (UL) means communication from a UE to a base station. For downlink, a transmitter may be part of a base station, and a receiver may be part of a UE. For uplink, a transmitter may be part of a UE, and a receiver may be part of a base station.

The terminology used herein is provided for a better understanding of the present disclosure, and changes may be made thereto without departing from the technical spirit of the present disclosure.

The following technology may be used in various radio access systems, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented as radio technology, such as IEEE 802.11 (Wi-Fi), IEEE 802.16 (WiMAX), IEEE 802-20, or E-UTRA (evolved UTRA). UTRA is part of UMTS (universal mobile telecommunications system). 3GPP (3rd generation partnership project) LTE (long term evolution) is part of E-UMTS (evolved UMTS) using E-UTRA and adopts OFDMA for downlink and SC-FDMA for uplink. LTE-A (advanced) is an evolution of 3GPP LTE.

The 5G NR defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

The 5G NR supports various subcarrier spacings and supports CP-OFDM on downlink and CP-OFDM and DFT-s-OFDM (SC-OFDM) on uplink.

Embodiments of the disclosure may be supported by standard documents disclosed in IEEE 802, 3GPP, and 3GPP2 which are radio access systems. In other words, in the embodiments of the disclosure, steps or parts skipped from description to clearly disclose the technical spirit of the present disclosure may be supported by the above documents. All the terms disclosed herein may be described by the standard documents.

For the clear description, embodiments of the present disclosure will be described focusing on 3GPP LTE/LTE-A/New Radio (NR), but the technical features of the present disclosure are not limited thereto.

In the present disclosure, 'A/B' or 'A and/or B' can be interpreted in the same sense as 'including at least one of A or B'.

Terminology eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Numerology: The numerology corresponds to one subcarrier spacing in a frequency domain. By scaling a reference subcarrier spacing by an integer N, different numerologies can be defined.

NR: NR Radio Access or New Radio

Overview of System

FIG. 1 is a view illustrating an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 2 represents the number of OFDM symbols per slot for a normal CP in the numerology μ, and Table 3 represents the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

With regard to physical resources in the NR system, an antenna port, a resource grid, a resource element, a resource block, a carrier part, etc. may be considered.

The above physical resources that can be considered in the NR system are described in more detail below.

First, with regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be considered as being in a quasi co-located or quasi co-location (QC/QCL) relationship. The large-scale properties include at least one of delay spread, Doppler spread, frequency shift, average received power, and received timing.

FIG. 3 illustrates an example of a resource grid supported in a wireless communication system to which a method described in the present disclosure is applicable.

Referring to FIG. 3, a resource grid consists of $N_{RB}^{\mu} N_{sc}^{RB}$ subcarriers on a frequency domain, each subframe consisting of 14·2µ OFDM symbols, but the present disclosure is not limited thereto.

In the NR system, a transmitted signal is described by one or more resource grids consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 4, one resource grid may be configured per numerology µ and antenna port p.

FIG. 4 illustrates examples of a resource grid per antenna port and numerology to which a method described in the present disclosure is applicable.

Each element of the resource grid for the numerology µ and the antenna port p is called a resource element and is uniquely identified by an index pair (k,l) where k=0, . . . , $N_{RB}^{\mu} N_{sc}^{RB}-1$ is an index on a frequency domain, and l=0, . . . , $2^{\mu} N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l) for the numerology µ and the antenna port p corresponds to a complex value $a_{k,l}^{(p,\mu)}$. When there is no risk for confusion or when a specific antenna port or numerology is not specified, the indexes p and µ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain. On the frequency domain, physical resource blocks are numbered from 0 to $N_{RB}^{\mu}-1$. A relation between a physical resource block number $n_{PRB}$ on the frequency domain and the resource elements (k,l) is given by Equation 1.

$$n_{PRB} = \left\lfloor \frac{k}{N_{sc}^{RB}} \right\rfloor \quad \text{[Equation 1]}$$

In regard to a carrier part, a UE may be configured to receive or transmit the carrier part using only a subset of the resource grid. In this instance, a set of resource blocks which the UE is configured to receive or transmit are numbered from 0 to $N_{URB}^{\mu}-1$ on the frequency domain.

Self-Contained Slot Structure

In order to minimize data transmission latency in a TDD system, 5th generation (5G) new RAT (NR) considers a self-contained subframe structure as illustrated in FIG. 5.

That is, FIG. 5 illustrates an example of a self-contained structure to which a method described in the present disclosure is applicable.

In FIG. 5, a hatched portion 510 represents a downlink control area, and a black portion 520 represents an uplink control area.

A non-hatched portion 530 may be used for downlink data transmission or for uplink data transmission.

Such a structure is characterized in that DL transmission and UL transmission are sequentially performed in one slot, and the transmission of DL data and the transmission and reception of UL ACK/NACK can be performed in one slot.

The slot described above may be defined as 'self-contained slot'.

That is, through such a slot structure, a base station can reduce the time it takes to retransmit data to a UE when a data transmission error occurs, and hence can minimize a latency of final data transfer.

In the self-contained slot structure, a time gap is necessary for the base station and the UE to switch from a transmission mode to a reception mode or to switch from the reception mode to the transmission mode.

To this end, some OFDM symbols at a time of switching from DL to UL in the self-contained slot structure are configured as a guard period (GP).

DL and UL Transmission/Reception Operations

DL Transmission and Reception Operation

FIG. 6 illustrates an example of a downlink transmission and reception operation.

Referring to FIG. 6, a base station schedules downlink transmission such as frequency/time resource, transmission layer, downlink precoder, and MCS in S601. In particular, the base station may determine a beam for PDSCH transmission to a UE through the beam management operations described above. The UE receives, from the base station, downlink control information (DCI) for downlink scheduling (i.e., including scheduling information of PDSCH) on PDCCH in S602. DCI format 1_0 or 1_1 may be used for downlink scheduling, and the DCI format 1_1 particularly includes the following information: an identifier for DCI formats, a bandwidth part indicator, frequency domain resource assignment, time domain resource assignment, a PRB bundling size indicator, a rate matching indicator, ZP CSI-RS trigger, antenna port(s), a transmission configuration indication (TCI), SRS request, and demodulation reference signal (DMRS) sequence initialization.

In particular, according to each state indicated in an antenna port(s) field, the number of DMRS ports may be scheduled, and single-user (SU)/multi-user (MU) transmission scheduling is also possible. A TCI field consists of 3 bits, and QCL for DMRS is dynamically indicated by indicating up to 8 TCI states according to a TCI field value. The UE receives downlink data from the base station on PDSCH in S603. If the UE detects PDCCH including DCI format 1_0 or 1_1, the UE decodes PDSCH according to an indication for the corresponding DCI.

When the UE receives PDSCH scheduled by DCI format 1, the UE may be configured with a DMRS configuration type by higher layer parameter 'dmrs-Type', and the DMRS type is used to receive the PDSCH. The UE may also be configured with the maximum number of front-loaded DMRS symbols for the PDSCH by higher layer parameter 'maxLength'

In case of DMRS configuration type 1, the UE assumes that all remaining perpendicular antenna ports do not associate with PDSCH transmission to another UE if a single codeword is scheduled and antenna ports mapped to indexes of {2, 9, 10, 11 or 30} are designated, or if two codewords are scheduled. Alternatively, in case of DMRS configuration type 2, the UE assumes that all remaining perpendicular antenna ports do not associate with PDSCH transmission to another UE if a single codeword is scheduled and antenna ports mapped to indexes of {2, 10 or 23} are designated, or if two codewords are scheduled.

The UE may assume a precoding granularity P' as consecutive resource blocks in the frequency domain when the UE receives PDSCH, where P' may correspond to one value of {2, 4, wideband}. If P' is determined as wideband, the UE does not expect to be scheduled with non-contiguous RBs and may assume that the same precoding is applied to assigned resources. On the other hand, if P' is determined as one of {2, 4}, a precoding resource block group (PRG) is divided into P' consecutive PRBs. The number of actually consecutive PRBs in each PRG may be one or more. The UE may assume that the same precoding is applied to consecutive downlink PRBs in the PRG.

In order for the UE to determine a modulation order, a target code rate, and a transport block size within PDSCH, the UE first reads 5-bit MCD field within DCI and determines the modulation order and the target code rate. Further, the UE reads a redundancy version field within the DCI and determines a redundancy version. The UE determines the transport block size using the number of layers and the total number of assigned PRBs before the rate matching.

UL Transmission and Reception Operation

FIG. 7 illustrates an example of an uplink transmission and reception operation.

Referring to FIG. 7, a base station schedules uplink transmission such as frequency/time resource, transmission layer, uplink precoder, and MCS in S701. In particular, the base station may determine a beam for PUSCH transmission to a UE through the beam management operations described above. The UE receives, from the base station, DCI for uplink scheduling (i.e., including scheduling information of PUSCH) on PDCCH in S702. DCI format 0_0 or 0_1 may be used for uplink scheduling, and the DCI format 0_1 particularly includes the following information: an identifier for DCI formats, UL/SUL (supplementary uplink) indicator, a bandwidth part indicator, frequency domain resource assignment, time domain resource assignment, a frequency hopping flag, a modulation and coding scheme (MCS), a SRS resource indicator (SRI), precoding information and number of layers, antenna port(s), SRS request, DMRS sequence initialization, and an uplink shared channel (UL-SCH) indicator.

In particular, SRS resources configured in a set of SRS resources associated with higher layer parameter 'usage' by a SRS resource indicator field may be indicated. 'spatialRelationInfo' may be configured for each SRS resource, and this value may be one of {CRI, SSB, SRI}.

The UE transmits uplink data to the base station on PUSCH in S702. If the UE detects PDCCH including the DCI format 0_0 or 0_1, the UE transmits the corresponding PUSCH accordion to an indication by the corresponding DCI. Two types of transmission method including codebook based transmission and non-codebook based transmission are supported for PUSCH transmission.

For the codebook based transmission, when higher layer parameter 'txConfig' is set to 'codebook', the UE is configured with the codebook based transmission. On the other hand, when the higher layer parameter 'txConfig' is set to 'nonCodebook', the UE is configured with the non-codebook based transmission. If the higher layer parameter 'txConfig' is not set, the UE does not expect to be scheduled by the DCI format 0_1. If the PUSCH is scheduled by the DCI format 0_0, the PUSCH transmission is based on a single antenna port. For the codebook based transmission, the PUSCH may be scheduled in the DCI format 0_0, the DCI format 0_1, or semi-statically. If this PUSCH is scheduled by the DCI format 0_1, the UE determines a PUSCH transmission precoder based on an SRI from DCI, a transmit precoding matrix indicator (TPMI), and a transmission tank, as given by a SRS resource indicator field and a field of precoding information and number of layers. The TPMI is used to indicate a precoder that may be applied over an antenna port, and corresponds to SRS resource selected by the SRI when multiple SRS resources are configured. Alternatively, if a single SRS resource is configured, the TPMI is used to indicate a precoder that may be applied over an antenna port, and corresponds to the corresponding single SRS resource. A transmission precoder is selected from an uplink codebook having the same number of antenna ports as upper layer parameter 'nrofSRS-Ports'. When the UE is configured with the higher layer parameter 'txConfig' set to 'codebook', at least one SRS resource is configured to the UE. A SRI indicated in a slot n is associated with the latest transmission of SRS resource identified by the SRI, where the SRS resource precedes the PDCCH (i.e., slot n) carrying the SRI.

For the non-codebook based transmission, the PUSCH may be scheduled in the DCI format 0_0, the DCI format 0_1, or semi-statically. When multiple SRS resources are configured, the UE may determine a PUSCH precoder and a transmission tank based on a wideband SRI, where the SRI is given by an SRS resource indicator within DCI, or given by upper layer parameter 'srs-ResourceIndicator'. The UE uses one SRS resource or multiple SRS resources for the SRS transmission, where the number of SRS resources may be configured for the simultaneous transmission within the same RB based on a UE capability. Only one SRS port is configured for each SRS resource. Only one SRS resource may be configured with the upper layer parameter 'usage' that is set to 'nonCodebook'. The maximum number of SRS resources that can be configured for the non-codebook based uplink transmission is 4. A SRI indicated in a slot n is associated with the latest transmission of SRS resource identified by the SRI, where the SRS transmission precedes the PDCCH (i.e., slot n) carrying the SRI.

Beam Management (BM)

A BM procedure, as layer 1 (L1)/layer 2 (L2) procedures for obtaining and maintaining a set of base station (e.g., gNB, TRP, etc.) and/or terminal (e.g., UE) beams available for downlink (DL) and uplink (UL) transmission/reception, may include the following procedures and terms.

Beam measurement: operation that the base station or the UE measures the characteristics of a received beamformed signal.

Beam determination: operation that the base station or the UE selects its transmit beam (Tx beam)/receive beam (Rx beam).

Beam sweeping: operation that covers a space region using the Tx beam/Rx beam for a predetermined time interval in a predetermined manner.

Beam report: operation that the UE reports information on a beamformed signal based on the beam measurement.

The BM procedure may be divided into (1) a DL BM procedure that uses synchronization signal (SS)/physical broadcast channel (PBCH) block or CSI-RS, and (2) an UL BM procedure that uses a sounding reference signal (SRS). Further, each BM procedure may include Tx beam sweeping for determining the Tx beam and RX beam sweeping for determining the Rx beam.

DL BM Procedure

A DL BM procedure may include (1) transmission for beamformed DL reference signals (RSs) (e.g., CSI-RS or SS block (SSB)) of a base station, and (2) beam reporting of a UE.

The beam reporting may include preferred DL RS identifier(s) (ID) and its corresponding L1-reference signal received power (RSRP).

The DL RS ID may be a SSB resource indicator (SSBRI) or a CSI-RS resource indicator (CRI).

FIG. 8 illustrates an example of beamforming using a SSB and a CSI-RS.

As illustrated in FIG. 8, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

1. DL BM Using SSB

FIG. 9 is a flow chart illustrating an example of a DL BM procedure using a SSB.

The configuration for beam reporting using a SSB is performed upon CSI/beam configuration in a RRC connected state (or RRC connected mode).

The UE receives, from the base station, CSI-ResourceConfig IE containing CSI-SSB-ResourceSetList including SSB resources used for BM, in S901.

Table 4 represents an example of CSI-ResourceConfig IE. As represented in Table 4, the BM configuration using the SSB is not separately defined and configures the SSB like CSI-RS resource.

TABLE 4

-- ASN1START
-- TAG-CSI-RESOURCECONFIG-START
CSI-ResourceConfig ::=          SEQUENCE {
    csi-ResourceConfigId            CSI-ResourceConfigId,
    csi-RS-ResourceSetList          CHOICE {
        nzp-CSI-RS-SSB                  SEQUENCE {
            nzp-CSI-RS-ResourceSetList      SEQUENCE (SIZE
                                            (1..maxNrofNZP-CSI-RS-
ResourceSetsPerConfig)) OF          OPTIONAL,
NZP-CSI-RS-ResourceSetId
            csi-SSB-ResourceSetList         SEQUENCE (SIZE
                                            (1..maxNrofCSI-SSB-
ResourceSetsPerConfig)) OF          OPTIONAL
CSI-SSB-ResourceSetId
        },
        csi-IM-ResourceSetList          SEQUENCE (SIZE
                                        (1..maxNrofCSI-IM-
ResourceSetsPerConfig)) OF CSI-IM-ResourceSetId
    },
    bwp-Id                          BWP-Id,
    resourceType                    ENUMERATED { aperiodic,
                                    semiPersistent, periodic ),
    ...
}
-- TAG-CSI-RESOURCECONFIGTOADDMOD-STOP
-- ASN1STOP In Table 4, csi-SSB-ResourceSetList parameter refers to a list of SSB resources used for the beam management and reporting in one resource set. The SSB resource set may be configured as {SSBx1, SSBx2, SSBx3, SSBx4, . . . }. The SSB index may be defined from 0 to 63.

The UE receives the SSB resource from the base station based on the CSI-SSB-ResourceSetList in S902.

If CSI-RS reportConfig related to reporting for SSBRI and L1-RSRP is configured, the UE (beam-)reports the best SSBRI and its corresponding L1-RSRP to the base station in S903.

That is, if reportQuantity of the CSI-RS reportConfig IE is set to 'ssb-Index-RSRP', the UE reports the best SSBRI and its corresponding L1-RSRP to the base station.

In addition, if the UE is configured with the CSI-RS resource in the same OFDM symbol(s) as SSB (SS/PBCH Block), and 'QCL-TypeD' is applicable, the UE may assume that the CSI-RS and the SSB are quasi co-located in terms of 'QCL-TypeD'.

The QCL TypeD may mean that the antenna ports are QCLed in terms of spatial Rx parameter. The same Rx beam may be applied when the UE receives a plurality of DL antenna ports with the QCL Type D relation. Further, the UE does not expect that the CSI-RS is configured in an RE overlapping an RE of the SSB.

2. DL BM Using CSI-RS

The use of CSI-RS is described as follows: i) if a repetition parameter is configured for a specific CSI-RS resource set and TRS_info is not configured for the specific CSI-RS resource set, the CSI-RS is used for beam management, ii) if the repetition parameter is not configured and the TRS_info is configured, the CSI-RS is used for a tracking reference signal (TRS), and iii) if the repetition parameter is not configured and the TRS_info is not configured, the CSI-RS is used for CSI acquisition.

The repetition parameter may be configured only for CSI-RS resource sets associated with CSI-ReportConfig that has a report of 'No Report (or None)' or L1 RSRP.

If the UE is configured with CSI-ReportConfig with reportQuantity set to 'cri-RSRP' or 'none', and if the CSI-ResourceConfig for channel measurement (higher layer parameter resourcesForChannelMeasurement) contains NZP-CSI-RS-ResourceSet that is configured with the higher layer parameter 'repetition' and without the higher layer parameter 'trs-Info', the UE can only be configured with the same number of ports (1-port or 2-port) with the higher layer parameter 'nrofPorts' for all CSI-RS resources within the NZP-CSI-RS-ResourceSet.

If (higher layer parameter) repetition is set to 'ON', it is related to an Rx beam sweeping procedure of the UE. In this case, if the UE is configured with NZP-CSI-RS-ResourceSet, the UE may assume that at least one CSI-RS resource within the NZP-CSI-RS-ResourceSet is transmitted with the same downlink spatial domain transmission filter. That is, at least one CSI-RS resource within the NZP-CSI-RS-ResourceSet is transmitted via the same Tx beam. At least one CSI-RS resource within the NZP-CSI-RS-ResourceSet may be transmitted in different OFDM symbols. The UE is not expected to receive different periodicity in periodicityAndOffset in all CSI-RS resources within the NZP-CSI-RS-Resourceset.

On the other hand, if the repetition is set to 'OFF', it is related to a Tx beam sweeping procedure of the base station. In this case, if the repetition is set to 'OFF', the UE does not assume that at least one CSI-RS resource within the NZP-CSI-RS-ResourceSet is transmitted with the same downlink spatial domain transmission filter. That is, at least one CSI-RS resource within the NZP-CSI-RS-ResourceSet is transmitted via different Tx beams.

FIG. 10 illustrates another example of a DL BM procedure using a CSI-RS.

FIG. 10(a) illustrates an Rx beam determination (or refinement) procedure of the UE, and FIG. 10(b) illustrates a Tx beam sweeping procedure of the base station. More specifically, FIG. 10(a) illustrates when a repetition parameter is set to 'ON', and FIG. 10(b) illustrates when a repetition parameter is set to 'OFF'.

An Rx beam determination process of the UE is described with reference to FIGS. 10(a) and 11.

FIG. 11 is a flow chart illustrating an example of a reception beam determination process of a UE.

The UE receives, from the base station, a NZP CSI-RS resource set IE including a higher layer parameter repetition via RRC signaling in S1101. Here, the repetition parameter is set to 'ON'.

The UE repeatedly receives resource(s) in a CSI-RS resource set configured with repetition 'ON' in different OFDM symbols via the same Tx beam (or DL spatial domain transmission filter) of the base station in S1102.

The UE determines its Rx beam in S1103.

The UE omits a CSI report in S1104. In this case, reportQuantity of CSI report config may be set to 'No report (or None)'.

That is, if the UE is configured with the repetition 'ON', the UE may omit the CSI report.

A Tx beam determination process of the base station is described with reference to FIGS. 10(b) and 12.

FIG. 12 is a flow chart illustrating an example of a transmission beam determination process of a base station.

The UE receives, from the base station, a NZP CSI-RS resource set IE including a higher layer parameter repetition via RRC signaling in S1201. Here, the repetition parameter is set to 'OFF', and is related to the Tx beam sweeping procedure of the base station.

The UE receives resources in a CSI-RS resource set configured with repetition 'OFF' via different Tx beams (DL spatial domain transmission filter) of the base station in S1202.

The UE selects (or determines) the best beam in S1203.

The UE reports an ID and relevant quality information (e.g., L1-RSRP) for the selected beam to the base station in S1204. In this case, reportQuantity of CSI report config may be set to 'CRI+L1-RSRP'.

That is, if the CSI-RS is transmitted for the BM, the UE reports CRI and L1-RSRP therefor to the base station.

FIG. 13 illustrates an example of resource allocation in a time domain and a frequency domain related to the operation of FIG. 10.

That is, if repetition 'ON' is configured in a CSI-RS resource set, a plurality of CSI-RS resources may apply the same Tx beam and may be repeatedly used, and if repetition 'OFF' is configured in the CSI-RS resource set, different CSI-RS resources may be transmitted via different Tx beams.

3. DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 6 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=        SEQUENCE {
  tci-StateId          TCI-StateId,
  qcl-Type1            QCL-Info,
  qcl-Type2            QCL-Info
      OPTIONAL,    -- Need R
  ...
}
QCL-Info ::=         SEQUENCE {
  cell                      ServCellIndex
      OPTIONAL,    -- Need R
  bwp-Id                    BWP-Id
      OPTIONAL, -- Cond CSI-RS-Indicated
  referenceSignal      CHOICE {
    csi-rs                  NZP-CSI-RS-ResourceId,
    ssb                     SSB-Index
  },
  qcl-Type             ENUMERATED {typeA, typeB, typeC, typeD},
  ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

4. Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with $K \geq 1$ SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 14 illustrates an example of an UL BM procedure using a SRS.

More specifically, FIG. 14(a) illustrates an Rx beam determination procedure of a base station, and FIG. 14(a) illustrates a Tx beam sweeping procedure of a UE.

FIG. 15 is a flow chart illustrating an example of an UL BM procedure using a SRS.

The UE receives, from the base station, RRC signaling (e.g., SRS-Config IE) including (higher layer parameter) usage parameter set to 'beam management' in S1501.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                           SEQUENCE {
    srs-ResourceSetToReleaseList            SEQUENCE (SIZE(1..maxNrofSRS-ResourceSets)) OF
SRS-ResourceSetId          OPTIONAL,    -- Need N
    srs-ResourceSetToAddModList             SEQUENCE (SIZE(1..maxNrofSRS-ResourceSets)) OF SRS-
ResourceSet               OPTIONAL,    -- Need N
    srs-ResourceToReleaseList               SEQUENCE (SIZE(1..maxNrofSRS-Resources)) OF SRS-
ResourceId                OPTIONAL,    -- Need N
    srs-ResourceToAddModList                SEQUENCE (SIZE(1..maxNrofSRS-Resources)) OF SRS-
Resource                  OPTIONAL,    -- Need N
        tpc-Accumulation                    ENUMERATED {disabled}
                          OPTIONAL,    -- Need S
    ...
}
SRS-ResourceSet ::=                      SEQUENCE {
    srs-ResourceSetId                       SRS-ResourceSetId,
    srs-ResourceIdList                      SEQUENCE (SIZE(1..maxNrofSRS-ResourcesPerSet)) OF
SRS-ResourceId    OPTIONAL,    -- Cond Setup
        resourceType                        CHOICE {
            aperiodic                       SEQUENCE {
                aperiodicSRS-ResourceTrigger        INTEGER (1..maxNrofSRS-TriggerStates-
1),
                csi-RS                              NZP-CSI-RS-ResourceId
                          OPTIONAL,    -- Cond NonCodebook
                slotOffset                          INTEGER (1..32)
                          OPTIONAL,    -- Need S
                ...
            },
            semi-persistent                 SEQUENCE {
                associatedCSI-RS                    NZP-CSI-RS-ResourceId
```

TABLE 6-continued

```
                                      OPTIONAL, -- Cond NonCodebook
            ...
        },
        periodic                      SEQUENCE {
            associatedCSI-RS                      NZP-CSI-RS-ResourceId
                                      OPTIONAL, -- Cond NonCodebook
            ...
        }
    },
    usage                             ENUMERATED {beamManagement, codebook,
nonCodebook, antennaSwitching},
    alpha                             Alpha
                                      OPTIONAL, -- Need S
    p0                                INTEGER (-202..24)
                                      OPTIONAL, -- Cond Setup
    pathlossReferenceRS               CHOICE {
        ssb-Index                         SSB-Index,
        csi-RS-Index                      NZP-CSI-RS-ResourceId
SRS-SpatialRelationInfo ::=       SEQUENCE {
    servingCellId                         ServCellIndex
    OPTIONAL,    -- Need S
    referenceSignal               CHOICE {
        ssb-Index                         SSB-Index,
        csi-RS-Index                      NZP-CSI-RS-ResourceId,
        srs                               SEQUENCE {
            resourceId                        SRS-ResourceId,
            uplinkBWP                         BWP-Id
        }
    }
}
SRS-ResourceId ::=                INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S1502. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S1503.

More specifically, for P-SRS with 'SRS-ResourceConfig-Type' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S1504.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to FIG. G(a) as the usage for the base station to select the Rx beam.

ii) The Spatial_Relation_Info may not be configured for all the SRS resources within the SRS resource set. In this case, the UE may perform transmission while freely changing SRS beams. That is, this case corresponds to FIG. G(b) as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

In new RAT (NR), a plurality of sounding reference signals (SRS) resource sets may be configured.

In this instance, a plurality of SRS resources may be configured in the SRS resource sets.

The base station may transmit, to the UE, configuration information on a plurality of SRS resource configurations.

For example, the base station may configure a timing behavior for the plurality of SRS resources through 'resourceType' that is one of parameters for information transmitted to the UE.

For example, a transmission period (e.g., one of aperiodic, semi-persistent, and periodic) of the plurality of SRSs may be configured by the higher layer signalling.

The aperiodic SRS transmission means transmitting the SRS without a specific period.

The aperiodic SRS is transmitted only when the aperiodic SRS is explicitly triggered via DCI.

The periodic SRS transmission means transmitting the SRS every specific period (specific symbol).

The semi-persistent SRS transmission means transmitting the SRS in a certain time interval via enable/disable signalling.

In this instance, the semi-persistent SRS has periodicity and slot offset, but actual semi-persistent SRS transmission according to the periodicity and the slot offset is enabled/disabled by MAC control element (CE) signalling.

If the transmission period of the SRS has been configured to aperiodic SRS, the slot offset (e.g., slot location to transmit the actual SRS based on a time receiving DCI containing SRS trigger) may be configured. If the transmission period of the SRS has been configured to periodic SRS or semi-persistent SRS, period/offset may be independently configured for each SRS resource.

Further, the base station may configure a SRS usage to the UE.

For example, each SRS resource set may configure one usage of 'teamManagement', 'nonCodebook', 'codebook', and 'antennaSwitching' via 'SRS-SetUse' that is one of parameters for information that the base station transmits to the UE, and may allow a transmission method of a plurality of SRS resources included in each SRS resource set to be configured.

Hence, when the UE transmits the SRSs to the base station, there may be an overlap in a transmission time between the plurality of SRS resources, and thus a corresponding operation needs to be defined.

More specifically, if the UE receives, from the base station, each configuration information related to a plurality of SRS transmissions, and a plurality of SRS transmission times are equally configured by the configuration information, the UE may determine a SRS transmission priority based on the configuration information and transmit, to the base station, a specific SRS selected depending on the determined transmission priority.

Methods for determining the priority are described in detail below.

(Embodiment 1)—Timing Behavior

Embodiment 1 described below is an implementation about a rule for determining a priority according to a timing behavior that two or more SRSs have.

In the existing LTE, a priority rule between an aperiodic SRS and a periodic SRS was defined.

Specifically, if transmission times of the aperiodic SRS and the periodic SRS overlap, the periodic SRS is not transmitted, and the aperiodic SRS is transmitted.

However, in the NR, a SRS with a semi-persistent transmission period has been added, and a priority between the SRS with the semi-persistent transmission period and a SRS with the periodic and aperiodic SRSs needs to be defined.

Aperiodic SRS(A-SRS)>Semi-Persistent SRS (S-SRS)>Periodic SRS(P-SRS)

First, this is a description for a priority when two or more SRSs have different timing behaviors.

That is, this is a priority rule that an aperiodic SRS has a higher priority than a semi-persistent SRS and a periodic SRS, and the semi-persistent SRS has a higher priority than the periodic SRS.

Two or more SRSs may have the same timing behavior, and in this case, a method for determining a priority is described.

In the existing LTE, there was no room for collision between SRS resources because there was no separate slot offset. However, in the NR, a collision may occur between SRS resources due to a slot offset.

In such a case, the priority may be determined based on the order in which triggers are transmitted.

For example, there may be a case in which two or more SRSs triggered via Layer 1 (L1)/Layer 2 (L2) signaling have the same timing behavior (e.g., two or more A-SRSs), and transmission times of the two or more SRSs overlap.

In this case, the priority may be determined according to the order in which triggers are transmitted.

That is, a SRS that is earlier triggered may have a higher priority. This is to secure an efficient UE operation.

Transmission times of the same S-SRS or P-SRS may overlap.

In this case, the priority may be determined depending on a length of a period.

That is, a SRS with a longer period may have a higher priority.

This is because when a problem occurs in the measurement of one SRS, a SRS having a long period may be affected more than a SRS having a short period (Embodiment 2)—SRS Usage Embodiment 2 described below is an implementation about a rule for determining a priority according to a usage of a SRS configured from a base station described above.

That is, different priority rules may be defined for different SRS usages (e.g., RRC parameter SetUse).

This is because a SRS of a specific usage has a greater influence on an actual operation than a SRS of another usage. For example, a SRS for beam management may be an object.

Hence, the priority rule may be defined as below.

SRS for Beam-Management>SRS for Non-Codebook, Codebook, Antenna Switching

A SRS configured with usage of beam-management has a higher priority than a SRS resource configured with another usage (e.g., non-codebook, codebook, antenna switching).

SRS for Antenna Switching>Non-Codebook, Codebook

A SRS configured with usage of antenna switching may be prioritized over a SRS configured with usage of non-codebook or codebook.

This means that the SRS of the antenna switching usage is to obtain downlink (DL) channel state information (CSI), and thus can have a different priority from the SRSs of non-codebook and codebook usages for obtaining uplink (UL) CSI.

That is, this is a priority rule that prioritizes the DL CSI over the UL CSI.

SRS for Antenna Switching, Codebook>Non-Codebook

A SRS configured with usage of codebook may be prioritized over a SRS configured with usage of non-codebook.

This is because the codebook among the non-codebook and the codebook can be used for a UE with full-reciprocity to obtain DL CSI.

This is a priority rule that prioritizes DL CSI over UL CSI, similar to the above manner.

(Embodiment 3)—SRS Resource Symbol Number

Embodiment 3 described below is an implementation about a rule for determining a priority according to SRS resource symbol number.

In the existing LTE, SRS resource was defined to assign one symbol. However, in the NR, the SRS resource symbol number may be variously assigned.

That is, the smaller the SRS resource symbol number assigned for SRS transmission is, the higher the priority is determined.

A UE may be configured from a base station with SRS resource symbol {1, 2, 4}.

In this instance, resources assigned for a plurality of SRS transmissions are respectively set to different symbol numbers. When transmission times of SRS resources configured over symbols of different numbers collide with each other, SRS resource set to a small symbol number may have a relatively higher priority than SRS resource set to a large symbol number.

That is, even if some of corresponding SRS symbols in the SRS resources having the larger symbol number are modified (i.e., dropped), they are relatively affected less than the SRS resources having the smaller symbol number.

(Embodiment 4)—Repetition Factor

Embodiment 4 described below is an implementation about a rule for determining a priority according to a repetition factor number.

That is, the smaller the repetition factor number is, the higher the priority is determined.

For example, a repetition factor of a SRS resource may be set to 'n'.

In this instance, since the same SRS symbol (e.g., SRS beam, SRS frequency hopping) is repeated within the configured SRS resource during n symbols, the SRS resource configured with a larger repetition factor is relatively affected less than the SRS resources configured with the smaller repetition factor even if some SRS symbols are modified.

Thus, the SRS resource with the small repetition factor may have a relatively higher priority than the SRS resource with the large repetition factor.

(Embodiment 5)—SRS Characteristics

One or more of the characteristics (timing behavior, SRS usage, SRS resource symbol number, and SRS repetition factor number) according to the above-described Embodiments 1 to 4 may be simultaneously applied.

In this instance, the order of applying hierarchy between the respective characteristics may be defined as below.

Timing Behavior>SRS Usage>SRS Symbol Number>SRS Repetition Factor

That is, a rule is defined such that the timing behavior is prioritized over the SRS usage, the SRS usage is prioritized over the SRS symbol number, and the SRS symbol number is prioritized over the SRS repetition factor However, a priority rule may be applied so that a SRS of a specific usage is prioritized over the timing behavior.

For example, if an aperiodic SRS with usage of non-codebook and a periodic SRS with usage of beam management collide with each other (transmission times are the same), the periodic SRS with the usage of beam management has a higher priority.

That is, according to the above-described Embodiment 5, the timing behavior is defined to be prioritized over the SRS usage, but a SRS of a specific usage (e.g., beam management) can be prioritized over the timing behavior.

Embodiment 6

Embodiment 6 is an implementation about a rule for determining a priority when SRS characteristics (timing behavior, SRS usage, SRS symbol number, and SRS repetition factor number) according to the above-described Embodiments 1 to 4 are the same.

When the above characteristics are the same, a UE may determine the priority based on the order of a carrier component index (CC ID), a bandwidth part index (BWP ID), and a SRS resource (set) index.

A priority of the SRS resource (set) via each ID may be determined in the order of CC ID→BWP ID→SRS resource set ID→SRS resource ID.

In other words, the CC ID may have a higher priority than the BWP ID, the BWP ID may have a higher priority than the SRS resource set ID, and the SRS resource set ID may have a higher priority than the SRS resource ID.

For example, transmission times of two SRS resources in which all the above characteristics are the same may collide with each other.

In this instance, the rule may be defined so that a SRS resource with less CC ID in the two SRS resources colliding with each other is prioritized, a SRS resource with less BWP ID is prioritized if the CC ID is the same, a SRS resource with less SRS resource set ID is prioritized if the BWP ID is the same, and a SRS resource with less SRS resource ID is prioritized if the SRS resource set ID is the same.

Embodiment 7

Embodiment 7 is an implementation about a rule for determining a priority when a guard period is configured in a SRS resource set.

For example, a guard period may be configured in a SRS resource set for a reason of antenna switching or beam management, etc.

In this instance, a priority of the corresponding guard period may be regarded as being the same as a SRS resource (set) in which the corresponding guard period is configured/included.

In particular, as above, if the guard period performs an operation (e.g., drop) related to a SRS with a low priority according to a priority rule, adjacent SRS resource, particularly, a subsequent SRS resource may take the same operation.

This is because the guard period is defined/configured for the purpose of ensuring a UE time for antenna switching and/or power transition.

In addition, this is because when the guard period is not secured, transmission of a subsequent SRS resource is impossible.

The priority rule described above may be configured via the higher layer signalling (e.g., signalling such as RRC).

For example, a base station may allow to apply the priority rule that prioritizes downlink channel state information (DL CSI) over uplink channel state information (UL CSI) as described above.

In addition, the base station may allow the uplink to have a higher priority than the downlink via the higher layer signalling according to the communication environment and purpose.

For example, the base station may configure so that codebook has a higher priority than non-codebook, and the non-codebook has a higher priority than antenna switching.

Hence, the base station may allow configuration for the priority to be adaptively configured via the higher layer signalling according to the operation purpose.

The higher layer signalling may be on a per SRS resource set basis, and in this case, a priority configured according to the above-described priority rule may be applied.

In the NR, 'the case in which two or more SRS resource transmissions have been configured/indicated in one symbol' may be defined as the case in which a collision of SRSs occurs.

This may be regarded as being the same as a collision for two SRS resources transmitted in the corresponding symbol even if there is no resource element (RE) in which the two SRS resources overlap each other in terms of frequency.

As described above, when a collision has occurred between SRSs, a rule (or method) for transmitting SRS symbols with the collision is described below.

Embodiment 8

(Embodiment 8-1)—Drop Low-Priority SRS Symbol of Overlapping SRS Symbols

This is an implementation about a rule for dropping SRS symbol with a low priority among overlapping SRS symbols.

That is, this allows a UE to not transmit SRS symbols of a SRS resource (set) corresponding to a low priority and to transmit SRS symbols of a SRS resource (set) corresponding to a high priority among overlapping SRS resources.

In other words, when some symbols of two SRS resource (sets) overlap, the UE drops only symbols corresponding to SRS resources with a low priority among overlapping SRS symbols and transmits remaining symbols.

Embodiment 8-2

This is an implementation about a rule for delaying transmission of SRS symbols with a low priority among overlapping SRS symbols up to a non-overlapping region.

That is, the UE delays transmission of SRS symbols of a SRS resource (set) corresponding to a low priority among overlapping SRS resources by 1-symbol (e.g., symbol index+1), and transmits SRS symbols of a SRS resource (set) corresponding to a high priority.

Such a delay of SRS symbols of the SRS resource (set) with the low priority is repeated until no more collision occurs.

The following two rules may be further defined in addition to the rule for delaying the symbol.

Embodiment 8-2-a

As described above, when SRS resource (sets) with different priorities overlap each other, this may define a boundary in which overlapping SRS symbols with a low priority can be delayed.

In this instance, this is a rule that can drop the corresponding SRS symbol when the delayed SRS symbol goes beyond the defined boundary.

The boundary may be a slot boundary or a last symbol of SRS resource(s).

Embodiment 8-2-b

If a collision occurs for the same SRS resource for a reason of a delay of a specific SRS symbol, etc., a non-delayed SRS symbol has a higher priority than a delayed SRS symbol.

In other words, as described above, when SRS resource (sets) with different priorities overlap each other, this is to delay SRS symbol with a low priority and allow the non-delayed SRS symbol to have a higher priority than the delayed SRS symbol if the delayed symbol collides with another SRS symbol of SRS resource with the low priority.

Even the above-described Embodiment 8 may be configured via the higher layer signalling (e.g., signalling such as RRC).

The method for determining a SRS priority according to the above-described embodiments may be equally applied to even if SRSs configured in different CCs, particularly, intra-band CC collide with each other, by performing CC hopping by the SRS.

FIG. 16 is a flow chart illustrating an operation method of a UE performing a method for transmitting a SRS based on a priority described in the present disclosure.

That is, FIG. 16 illustrates an operation method of a UE transmitting a sounding reference signal (SRS) in a wireless communication system.

First, a UE receives, from a base station, configuration information related to a first SRS resource assigned for transmission of a first SRS and a second SRS resource assigned for transmission of a second SRS in S1610.

The configuration information may include type information representing whether or not SRS transmission has periodicity, and usage information representing which usage the SRS has.

When a transmission time of the first SRS is the same as a transmission time of the second SRS, the UE transmits the first SRS or the second SRS to the base station based on a priority between the first SRS and the second SRS in S1620.

The priority may be determined based on at least one of the type information or the usage information.

The priority may be received via higher layer signalling.

The type information may be one of periodic, semi-persistent, and aperiodic, and the usage information may be one of beam-management, codebook, and non-codebook.

The priority may be determined based on the type information and may be configured such that a SRS (aperiodic SRS) having an aperiodic transmission period has a higher priority than a SRS (semi-persistent SRS) having a semi-persistent transmission period, and the SRS (semi-persistent SRS) having the semi-persistent transmission period has a higher priority than a SRS (periodic SRS) having a periodic transmission period.

The configuration information may further include trigger information for the transmission of the first SRS and the second SRS, and the priority may be determined based on the order in which the trigger information is received when the SRS transmission period is the same.

The priority may be determined based on the usage information and may be configured such that the beam-management has a higher priority than the antenna switching, the antenna switching has a higher priority than the codebook, and the codebook has a higher priority than the non-codebook.

The configuration information may further include information on a symbol number of the assigned first SRS resource and second SRS resource, and the priority may be determined based on the information on the symbol number.

The configuration information may further include information on a repetition factor, and the priority may be determined based on the information on the repetition factor.

In the step S1620, when transmission times of some resources of the resources assigned for the transmission of the first SRS or the second SRS to the base station are the same, the UE may drop a resource assigned for transmission of a SRS with a low priority among the some resources, or delay a resource assigned for transmission of a SRS with a low priority among the some resources by one symbol.

With reference to FIGS. 16, 18, and 19, the following is given a description that transmission of a sounding reference signal (SRS) in a wireless communication system described in the present disclosure is implemented by a UE.

A UE transmitting a sounding reference signal (SRS) in a wireless communication system may include a radio frequency (RF) module configured to transmit and receive a radio signal and a processor functionally connected to the RF module.

First, the processor of the UE may receive, from a base station, configuration information related to a first SRS resource assigned for transmission of a first SRS and a second SRS resource assigned for transmission of a second SRS.

The configuration information may include type information representing whether or not SRS transmission has periodicity, and usage information representing which usage the SRS has.

When a transmission time of the first SRS is the same as a transmission time of the second SRS, the processor of the UE may transmit the first SRS or the second SRS to the base station based on a priority between the first SRS and the second SRS.

The priority may be determined based on at least one of the type information or the usage information.

The priority may be received via higher layer signalling.

The type information may be one of periodic, semi-persistent, and aperiodic, and the usage information may be one of beam-management, codebook, non-codebook, and antenna switching.

The priority may be determined based on the type information and may be configured such that a SRS (aperiodic SRS) having an aperiodic transmission period has a higher priority than a SRS (semi-persistent SRS) having a semi-persistent transmission period, and the SRS (semi-persistent SRS) having the semi-persistent transmission period has a higher priority than a SRS (periodic SRS) having a periodic transmission period.

The configuration information may further include trigger information for the transmission of the first SRS and the second SRS, and the priority may be determined based on the order in which the trigger information is received when the type information is the same.

The priority may be determined based on the usage information and may be configured such that the beam-management has a higher priority than the antenna switching, the antenna switching has a higher priority than the codebook, and the codebook has a higher priority than the non-codebook.

The configuration information may further include information on a symbol number of the assigned first SRS resource and second SRS resource, and the priority may be determined based on the information on the symbol number.

The configuration information may further include information on a repetition factor, and the priority may be determined based on the information on the repetition factor.

When transmission times of some resources of the resources assigned for the transmission of the first SRS or the second SRS to the base station are the same, the UE may drop a resource assigned for transmission of a SRS with a low priority among the some resources, or delay a resource assigned for transmission of a SRS with a low priority among the some resources by one symbol.

FIG. 17 is a flow chart illustrating an operation method of a base station performing a method described in the present disclosure.

That is, FIG. 17 illustrates an operation method of a base station receiving a sounding reference signal (SRS) in a wireless communication system.

First, a base station transmits, to a UE, configuration information related to a first SRS resource assigned for transmission of a first SRS and a second SRS resource assigned for transmission of a second SRS in S1710.

Next, the base station transmits, to the UE, information on a priority between the first SRS resource and the second SRS resource in S1720.

Next, the base station receives, from the UE, the first SRS or the second SRS determined based on the priority in S1730.

With reference to FIGS. 17 to 19, the following is given a description that reception of a sounding reference signal (SRS) in a wireless communication system described in the present disclosure is implemented by a base station.

A base station receiving a sounding reference signal (SRS) in a wireless communication system may include a radio frequency (RF) module configured to transmit and receive a radio signal and a processor functionally connected to the RF module.

First, the processor of the base station may transmit, to a UE, configuration information related to a first SRS resource assigned for transmission of a first SRS and a second SRS resource assigned for transmission of a second SRS.

The configuration information may include type information representing whether or not a SRS transmission has periodicity, and usage information representing which usage the SRS has.

The processor of the base station may transmit, to the UE, information on a priority between the first SRS resource and the second SRS resource.

The processor of the base station may receive, from the UE, the first SRS or the second SRS determined based on the priority.

The priority is determined based on at least one of the type information or the usage information.

When the above technologies are actually applied, the above technologies can be applied alone or in combination.

The present disclosure has been described based on the 3GPP LTE system for convenience of explanation, but the system to which the present disclosure is applicable can be extended to systems (e.g., UTRA, etc.), particularly, 5G system and its candidate technologies, other than the 3GPP LTE system.

Overview of Device to which the Present Disclosure is Applicable

FIG. 18 illustrates a block configuration diagram of a wireless communication device to which methods described in the present disclosure are applicable.

Referring to FIG. 18, a wireless communication system includes a base station 1810 and multiple UEs 1820 located in an area of the base station.

Each of the base station 1810 and the UE 1820 may be represented as a wireless device.

The base station 1810 includes a processor 1811, a memory 1812, and a radio frequency (RF) unit 1813. The processor 1811 implements functions, processes, and/or methods described in FIGS. 1 to 17. Layers of radio interface protocol may be implemented by the processor 1811. The memory 1812 is connected to the processor 1811 and stores various types of information for driving the processor 1811. The RF unit 1813 is connected to the processor 1811 and transmits and/or receives radio signals.

The UE 1820 includes a processor 1821, a memory 1822, and a RF unit 1823.

The processor 1821 implements functions, processes, and/or methods described in FIGS. 1 to 17. Layers of radio interface protocol may be implemented by the processor 1821. The memory 1822 is connected to the processor 1821 and stores various types of information for driving the processor 1821. The RF unit 1823 is connected to the processor 1821 and transmits and/or receives radio signals.

The memories 1812 and 1822 may be inside or outside the processors 1811 and 1821 and may be connected to the processors 1811 and 1821 through various well-known means.

Further, the base station 1810 and/or the UE 1820 may have a single antenna or multiple antennas.

FIG. 19 illustrates another block configuration diagram of a wireless communication device to which methods described in the present disclosure are applicable.

Referring to FIG. 19, a wireless communication system includes a base station 1910 and multiple UEs 1920 located in an area of the base station. The base station 1910 may be represented by a transmitter, and the UE 1920 may be represented by a receiver, or vice versa. The base station 1910 and the UE 1920 respectively include processors 1911 and 1921, memories 1914 and 1924, one or more Tx/Rx RF modules 1915 and 1925, Tx processors 1912 and 1922, Rx processors 1913 and 1923, and antennas 1916 and 1926. The processors implement functions, processes, and/or methods described above. More specifically, in DL (communication from the base station to the UE), an upper layer packet from a core network is provided to the processor 1911. The processor implements functionality of the L2 layer. In the DL, the processor provides multiplexing between a logical channel and a transport channel and radio resource allocation to the UE 1920 and is also responsible for signaling to the UE 1920. The transmit (Tx) processor 1912 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1916 via a separate Tx/Rx module (or transceiver 1915). Each Tx/Rx module may modulate an RF carrier with a respective spatial stream for transmission. At the UE, each Tx/Rx module (or transceiver 1925) receives a signal through the respective antenna 1926 of each Tx/Rx module. Each Tx/Rx module recovers information modulated onto an RF carrier and provides the information to the receive (Rx) processor 1923. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that were originally transmitted by the base station on the physical channel. The corresponding data and control signals are provided to the processor 1921.

UL (communication from the UE to the base station) is processed at the base station 1910 in a manner similar to the description associated with a receiver function at the UE 1920. Each Tx/Rx module 1925 receives a signal through the respective antenna 1926. Each Tx/Rx module provides an RF carrier and information to the Rx processor 1923. The processor 1921 may be associated with the memory 1924 that stores a program code and data. The memory may be referred to as a computer readable medium.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR system and the 5G system (new RAT system), it can be applied to various wireless communication systems other than the 3GPP LTE/LTE-A/NR system.

The invention claimed is:

1. A method of transmitting, by a user equipment (UE), a sounding reference signal (SRS) in a wireless communication system, the method comprising:
   receiving, from a base station, SRS related configuration information,
   wherein the SRS related configuration information includes usage information for an SRS resource and type information for the SRS resource, and
   wherein the SRS resource includes a first SRS resource for a first SRS and a second SRS resource for a second SRS; and
   based on the first SRS resource overlapping with the second SRS, transmitting, to the base station, the first SRS or the second SRS based on a priority rule,
   wherein the priority rule indicates that a priority for the SRS resource is determined based on (i) the usage information for the SRS resource, (ii) an identification (ID) of a component carrier (CC) for the SRS resource, and (iii) an ID of an SRS resource set for the SRS resource, and
   wherein based on the first SRS resource with the usage information set as 'antennaSwitching' and the second SRS resource with the usage information set as 'codebook' or 'nonCodebook', the first SRS is transmitted with a higher priority than the second SRS.

2. The method of claim 1, wherein based on that a usage of the first SRS resource is the same as the second SRS resource and a first CC index of the first SRS resource is lower than a second CC index of the second SRS resource, the first SRS is transmitted with the higher priority than the second SRS.

3. The method of claim 2, wherein based on that the first CC index is the same as the second CC index and an identifier (ID) of an SRS resource set including the first SRS resource being lower than an ID of an SRS resource set including the second SRS resource, the first SRS is transmitted with the higher priority than the second SRS.

4. The method of claim 3, wherein based on that the ID of the first SRS resource set is the same as the second SRS resource set and an ID of the first SRS resource being lower than an ID of the second SRS resource, the first SRS is transmitted with the higher priority than the second SRS.

5. The method of claim 1, wherein the SRS resource is an aperiodic SRS resource.

6. The method of claim 1, wherein the SRS related configuration information further includes information associated with a number of symbols for the SRS resource,
   wherein the priority for the SRS resource is determined based on the information associated with the number of symbols.

7. The method of claim 1, wherein the SRS related configuration information further includes information for a repetition factor,
   wherein the priority for the SRS resource is determined based on the information for the repetition factor.

8. The method of claim 1, further comprising:
   dropping an SRS resource with a lower priority among the first SRS resource and the second SRS resource, or
   delaying an SRS resource with the lower priority among the first SRS resource and the second SRS resource by one symbol.

9. A user equipment (UE) configured to transmit a sounding reference signal (SRS) in a wireless communication system, the UE comprising:
   a transceiver;
   at least one processor; and
   at least one memory operably connectable to the at least one processor and storing instructions that, based on being executed by the at least one processor, perform operations comprising:
   receiving, from a base station, SRS related configuration information,
   wherein the SRS related configuration information includes usage information for an SRS resource and type information for the SRS resource, and
   wherein the SRS resource includes a first SRS resource for a first SRS and a second SRS resource for a second SRS; and
   based on the first SRS resource overlapping with the second SRS resource, transmitting, the base station, the first SRS or the second SRS based on a priority rule,
   wherein the priority rule indicates that a priority for the SRS resource is determined based on (i) the usage information for the SRS resource, (ii) an identification (ID) of a component carrier (CC) for the SRS resource, and (iii) an ID of an SRS resource set for the SRS resource, and
   wherein based on the first SRS resource with the usage information set as 'antennaSwitching' and the second SRS resource with the usage information set as 'codebook' or 'nonCodebook', the first SRS is transmitted with a higher priority than the second SRS.

10. The UE of claim 9, wherein based on that a usage of the first SRS resource is the same as the second SRS resource and a first CC index of the first SRS resource is lower than a second CC index of the second SRS resource, the first SRS is transmitted with a higher priority than the second SRS.

11. The UE of claim 10, wherein based on that the first CC index is the same as the second CC index and an identifier (ID) of an SRS resource set including the first SRS resource being lower than an ID of an SRS resource set including the second SRS resource, the first SRS is transmitted with the higher priority than the second SRS.

12. The UE of claim 11, wherein based on that the ID of the first SRS resource set is the same as the second SRS resource set and an ID of the first SRS resource being lower than an ID of the second SRS resource, the first SRS is transmitted with the higher priority than the second SRS.

13. The UE of claim 9, wherein the SRS resource is an aperiodic SRS resource.

14. The UE of claim 9,
   wherein the SRS related configuration information further includes information tor associated with a number of symbols for the SRS resource, and wherein the priority for the SRS resource is determined based on the information associated with for the number of symbols.

15. The UE of claim 9, wherein the SRS related configuration information further includes information for a repetition factor, wherein the priority for the SRS resource is determined based on the information for the repetition factor.

16. The UE of claim 9, further comprising:

dropping an SRS resource with a lower priority among the first SRS resource and the second SRS resource, or delaying an SRS resource with the lower priority among the first SRS resource and the second SRS resource by one symbol.

17. A method of receiving, by a base station, a sounding reference signal (SRS) in a wireless communication system, the method comprising:

transmitting, to a user equipment (UE), SRS related configuration information, wherein the SRS related configuration information includes usage information for an SRS resource and type information for the SRS resource, and wherein the SRS resource includes a first SRS resource for a first SRS and a second SRS resource for a second SRS; and based on the first SRS resource overlapping with the second SRS resource, receiving, from the UE, the first SRS or the second SRS based on a priority rule, wherein the priority rule indicates that a priority for the SRS resource is determined based on (i) the usage information for the SRS resource, (ii) an identification (ID) of a component carrier (CC) for the SRS resource, and (iii) an ID of an SRS resource set for the SRS resource, and wherein based on the first SRS resource with the usage information set as 'antennaSwitching' and the second SRS resource with the usage information set as 'codebook' or 'nonCodebook', the first SRS is transmitted with a higher priority than the second SRS.

* * * * *